(12) United States Patent
Zhang et al.

(10) Patent No.: US 6,528,782 B1
(45) Date of Patent: Mar. 4, 2003

(54) CHROMOGENIC LIGHT FILTER AND CONTROLS

(75) Inventors: Raymond Zhang; Anoop Agrawal; Bob Lecompte; Juan Carlos Lopez Tonazzi; Stephan Hansen, all of Tucson, AZ (US)

(73) Assignee: Schott Donnelly LLC, Tucson, AZ (US)

( * ) Notice: Subject to any disclaimer, the term of this patent is extended or adjusted under 35 U.S.C. 154(b) by 0 days.

(21) Appl. No.: 09/595,315

(22) Filed: Jun. 16, 2000

Related U.S. Application Data

(63) Continuation-in-part of application No. 09/493,263, filed on Jan. 27, 2000, which is a division of application No. 08/914,876, filed on Aug. 20, 1997, now Pat. No. 6,039,390, which is a continuation-in-part of application No. 08/699,940, filed on Aug. 20, 1996, now abandoned.

(51) Int. Cl.$^7$ .................................................. G01J 3/50
(52) U.S. Cl. ....................................... 250/226; 250/205
(58) Field of Search ................................ 250/226, 205, 250/216; 359/265, 273, 275, 229, 230; 52/200

(56) References Cited

U.S. PATENT DOCUMENTS 5,659,417 A * 8/1997 Van Dine et al. ............ 359/273

* cited by examiner

*Primary Examiner*—Que T. Le
(74) *Attorney, Agent, or Firm*—Fitzpatrick, Cella, Harper & Scinto

(57) ABSTRACT

A user-controlled skylight window or the like in which the user can control the light transmitted through the skylight. A chromogenic filter is under automatic control of a control circuit. A user interface permits the user to set the control circuit for desired lighting. A mechanical shutter is likewise controlled to open or close the skylight under control of the user interface. A lamp within the skylight provides nighttime lighting under user control. The diffuseness of light transmitted through the skylight is improved by modifying the diffuseness of various components of the skylight including the filter. Uses of the filter in a variety of systems and with a variety of controls are disclosed.

83 Claims, 18 Drawing Sheets

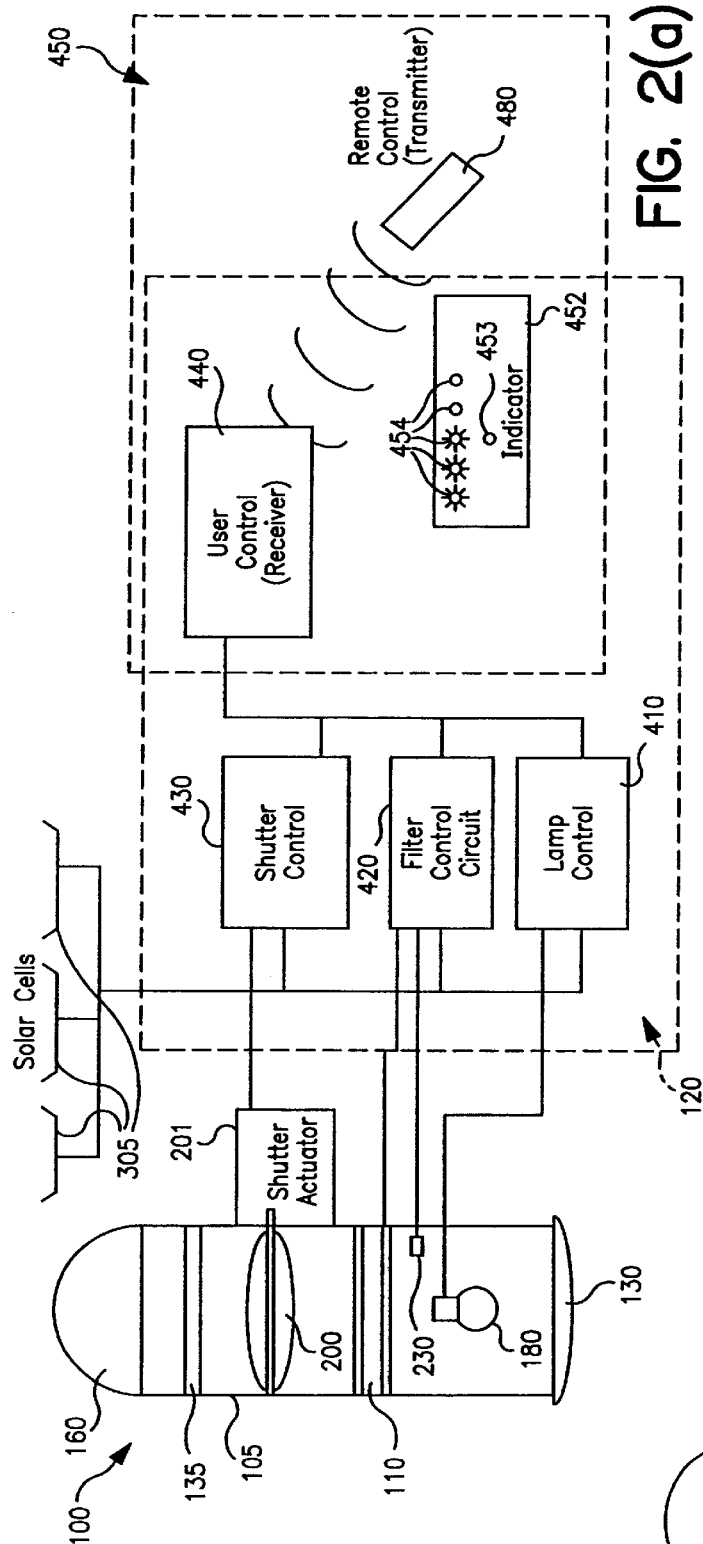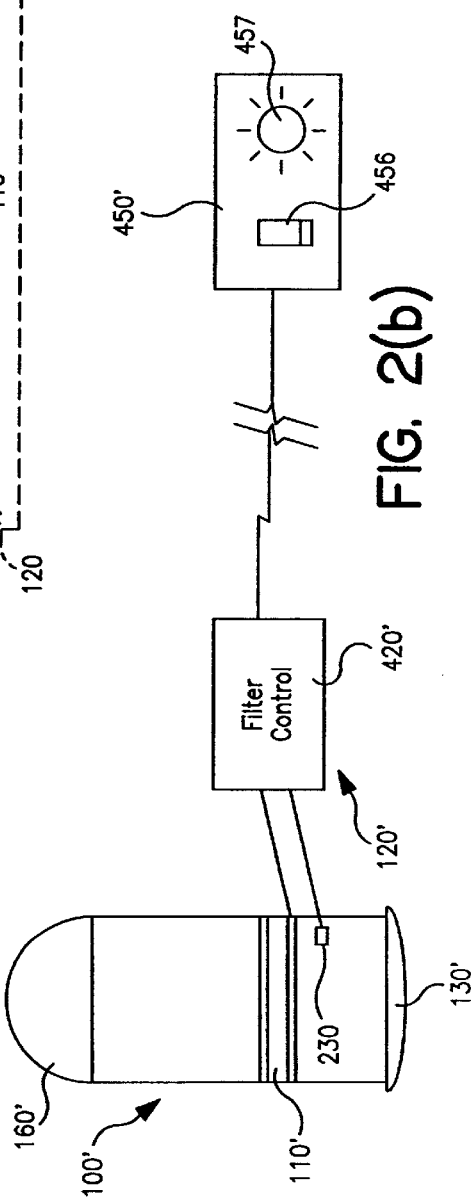

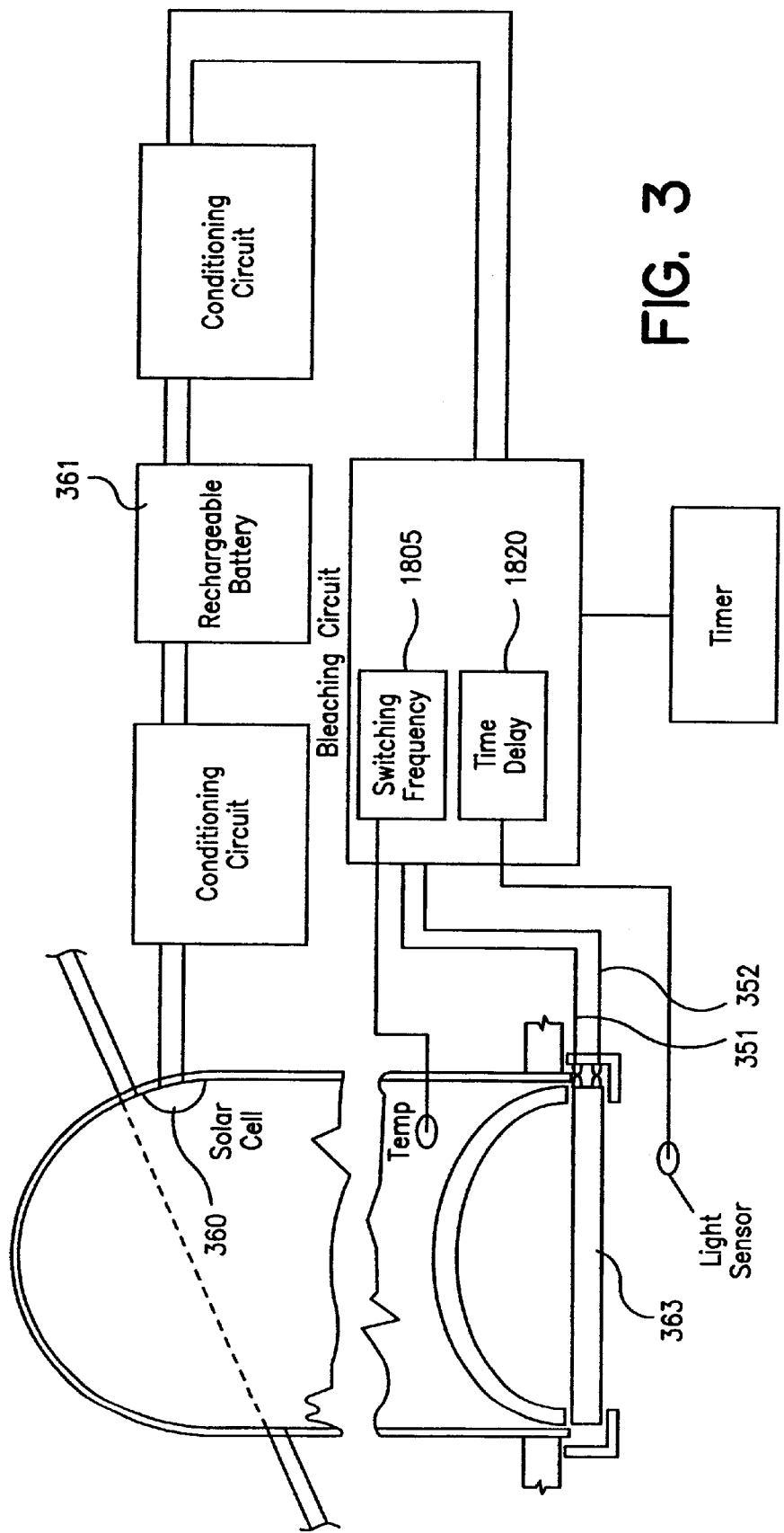

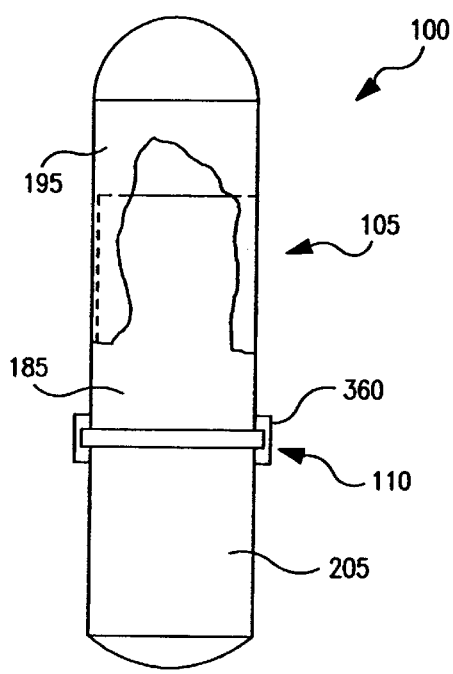
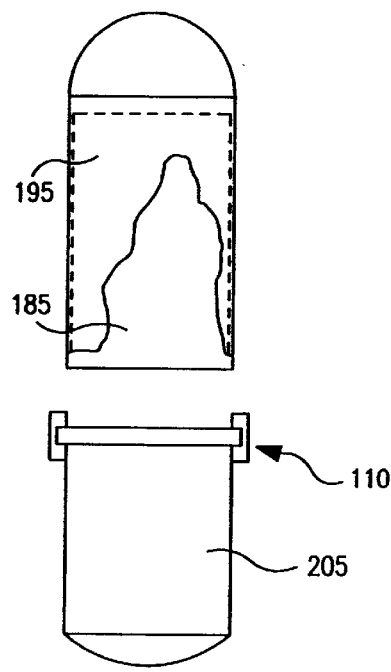
FIG. 9(a)            FIG. 9(b)
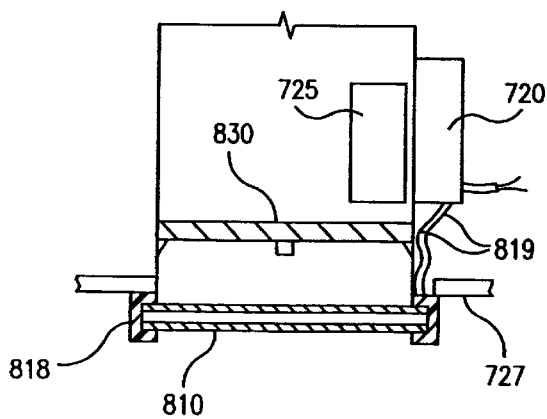
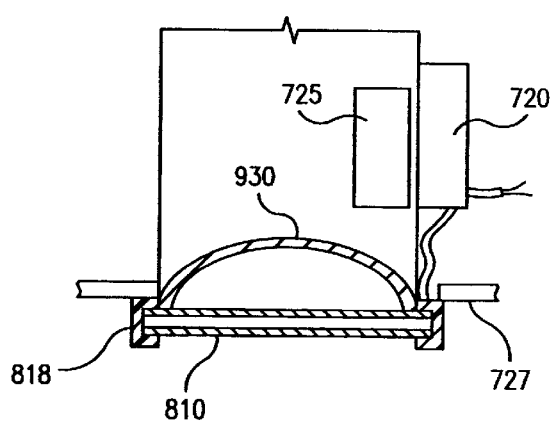
FIG. 10            FIG. 11

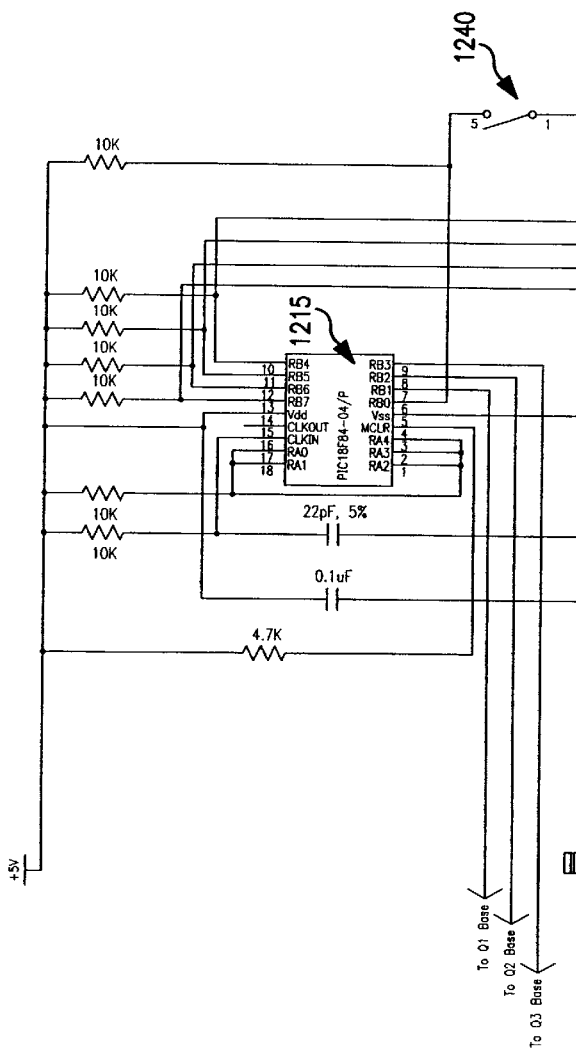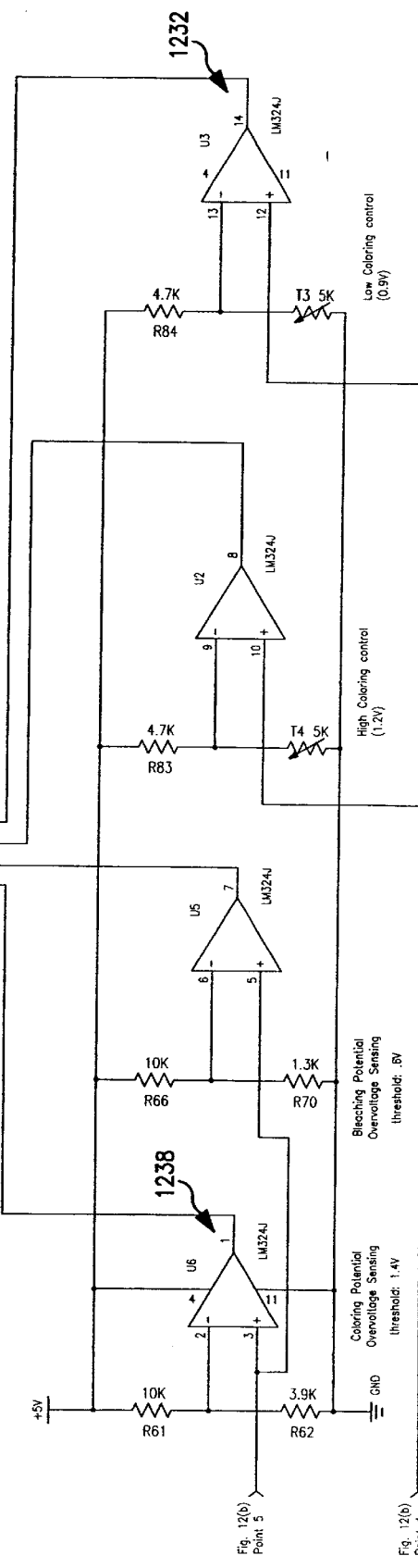
FIG. 12(c)

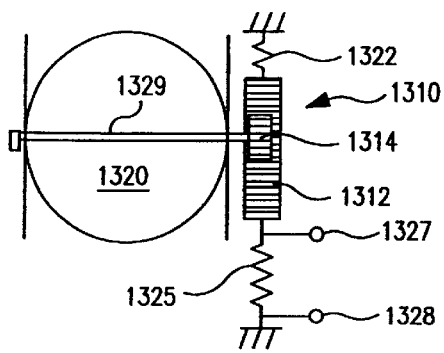
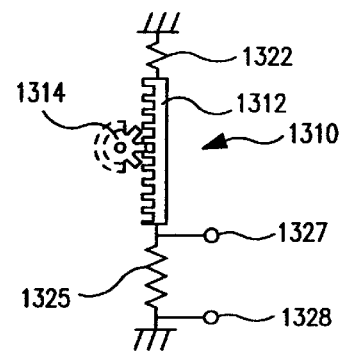
FIG. 13(b)    FIG. 13(a)
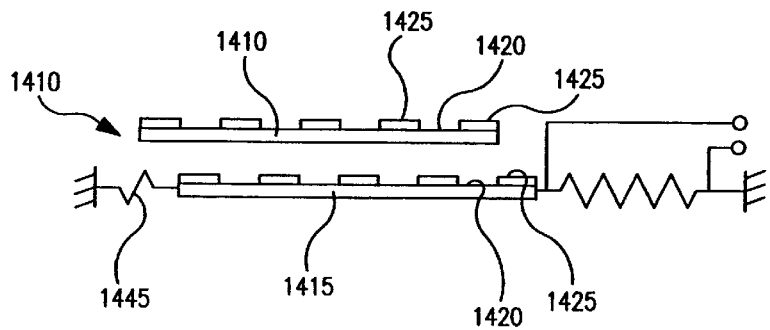
FIG. 14
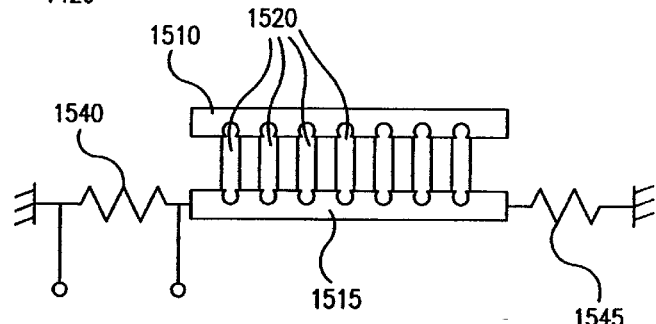
FIG. 15
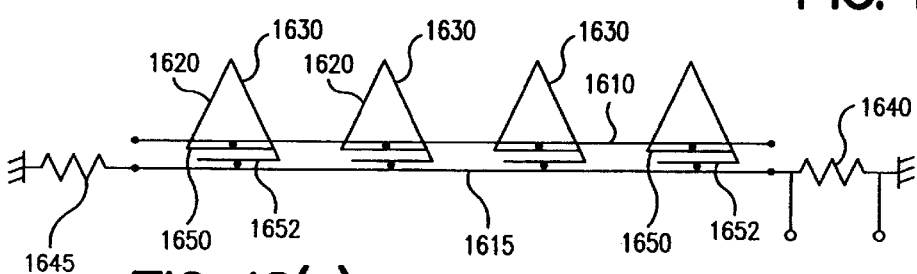
FIG. 16(a)
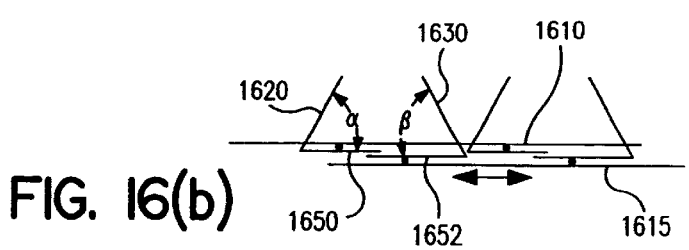
FIG. 16(b)

CHROMOGENIC LIGHT FILTER AND CONTROLS

REFERENCE TO RELATED APPLICATIONS

This is a continuation-in-part of U.S. patent application Ser. No. 09/493,263, entitled Chromogenic Window Construction and Other Chromogenic Devices, filed Jan. 27, 2000, now is pending; which is a division of U.S. patent application Ser. No. 08/914,876, filed Aug. 20, 1997, now U.S. Pat. No. 6,039,390; which is a continuation in part of U.S. patent application Ser. No. 08/699,940, filed Aug. 20, 1996, now abandoned; all of which applications are incorporated herein by reference. For common subject matter herein, priority is claimed from each of the above applications.

FIELD OF THE INVENTION

The present invention relates generally to skylights employing chromogenic filters, and more particularly, to improvements in the light harvesting, light control, electrical operation, electrical control and serviceability of such skylights.

BACKGROUND OF THE INVENTION

Skylights are frequently employed in various types of structures for practical, as well as aesthetic reasons. They bring in natural light, reducing the need for artificial light. This saves electricity and reduces cost.

Various characteristics of the conventional tubular skylight can affect the wave length of the light transmitted. For example, as shown in FIG. 1, a tubular skylight A, as known in the art, may reduce UV transmission without significant reduction of visible light if light entering the tubular skylight reflects from a highly reflective, but UV absorbtive, tubular inside surface B. UV transmission may further be diminished by light passing through a collection dome C and a light diffuser D.

Finally, skylights have recently seen the suggested addition of chromogenic filters. Such filters hold the promise of controlling the intensity of light transmitted through a skylight. Various technologies for producing user-controllable chromogenic filters have been proposed. Examples include electrochromic filters, liquid-crystal filters, user-controlled-photochromic filters, polymer-dispersed-liquid-crystal filters, and suspended-particle filters. These are described in U.S. provisional patent application Ser. No. 60/091,678, filed Jul. 2, 1998 and U.S. patent application Ser. No. 09/347,807, Busbars for Electrically Powered Cells, now U.S. Pat. No. 6,317,248, and filed Jul. 2, 1999, and U.S. patent application Ser. No. 08/914,876, Chromogenic Window Assembly Construction and Other Chromogenic Devices, now U.S. Pat. No. 6,039,390, filed Aug. 20, 1997, each incorporated herein by reference.

The term user controllable is used herein in the same sense as in the above-mentioned U.S. Pat. No. 6,039,390, entitled Chromogenic Window Assembly Construction and Other Chromogenic Devices. There it is said:

The term "user-controllable" is used in the sense that the appearance of a chromogenic device can be regulated. Photochromic devices, because their coloration is a function of light intensity, are not directly "user-controllable". However, systems incorporating photochromic devices can be designed in which users can regulate such devices. For the purposes of this application, those systems would also be considered "user-controllable".

Chromogenic light filters are very useful in regulating the light through skylights at the discretion of the user. A description of various user controllable chromogenic technologies is given in the U.S. application Ser. No. 09/347,807 filed Jul. 2, 1999, incorporated herein by reference. Typically, such chromogenic devices are based on electrochromic technology, user controllable photochromic technology, liquid crystal technology and suspended particles which orient in an electric field. User controlled thermochromic devices (U.S. Pat. No. 5,525,430, incorporated by reference herein) have also been suggested where the user can vary the temperature of the chromogenic member to alter its transmission. Chromogenic filters are useful for both tubular skylights and conventional skylights. One example of technology useful for chromogenic filters is the electrochromic device discussed by N. R. Lynam and A. Agrawal in "Automotive Applications of Chromogenic Materials," *Large Area Chromogenics: Materials & Devices for Transmittance Control*, C. M. Lampert and C. G. Granqvist, editors, Optical Engineering Press, Bellingham, Washington (1989), which is hereby incorporated by reference.

The present invention relates to improving:

(1) Effectiveness of light harvesting by a skylight and reduction of sharp images or light patterns in the building interior such as might adversely affect a work area.

(2) Placement of sensors in the skylight system to effectively control the transmittance of the light through the chromogenic filters.

(3) Skylights with mechanical shades.

(4) Skylights in which the power to the chromogenic filters is provided by solar cells and that preferably are remotely activated by the user so that they can be easily retrofitted.

(5) Serviceable chromogenic light filters that can be easily repaired and/or replaced.

SUMMARY OF THE INVENTION

In accordance with the present invention, user-controllable chromogenic skylights are provided with improved light control. In a preferred embodiment, the invention provides for user control of the intensity of light from a skylight through the control of a chromogenic filter in combination with one or more of a remotely controllable mechanical shutter that provides darkness during the day and an internally mounted lamp to provide nighttime illumination. Short of complete blockage of light by the mechanical shutter, intermediate light intensity control is achieved by control of the user-controllable chromogenic filter.

All type of skylights will benefit from this invention, but some aspects of this invention are more suitable for the tubular skylights.

Like skylights described in the above-mentioned patent applications, skylights embodying features of the current invention may have an outward end with a light capturing dome, a tubular light path and an interior diffuser capping the skylight's inward end. In this configuration, the chromogenic filter resides within or at the end of the tubular light path below the exterior dome. As the light travels through the skylight, its intensity is modified by the chromogenic filter that intercepts the light path. The skylight optionally includes a secondary diffuser (or diffusers), the mechanical shutter and the lamp. Control circuitry is provided for the chromogenic filter, the lamp and the mechanical shutter. Preferably, the control circuitry for the chromogenic filter, the shutter and the lamp share a single user-accessible interface by which the user sets the chromogenic filter transmittance, opens or closes the mechanical shutter, turns the lamp on or off, and perhaps sets the lamp intensity.

A user interface can be hard-wired into the control circuitry. Preferably, it is linked by radio frequency or infrared transmission. A sensor to receive an infrared transmission is located to be in a direct line of sight of the user interface. In a preferred embodiment, it is located out of sight behind the interior light diffuser. Also, in a preferred embodiment, multiple sensors increase the area within the building interior from which line of sight communication by a user's remote control interface is available. Preferably, a visible or audible indicator communicates that the sensor has received the user's commands. The indicator can be a simple lighted or flashing LED, an audible tone generator, a bank of LEDs connected to act as a bar graph, an alphanumeric display, etc. The indicator is particularly useful to signal the receipt of a command and the start of a change of transmittance by the chromogenic light filter since this is a gradual change not immediately apparent.

The chromogenic filter allows for user control of the intensity of light and possibly color that is transmitted through the skylight. Any of a number of chromogenic materials can function in this invention as mentioned above. Chromogenic materials change transmittance in response to an external signal. For example, electrochromic materials change transmittance based on an applied electrical potential. A filter control circuit supplies the electrical potential (the filter signal), which causes a transmittance that corresponds to a light intensity set-point. The light intensity set-point of the filter control circuit is substantially under the user's control.

In one embodiment, the chromogenic filter closes the interior end of the skylight rather than the diffuser. A diffuser is located intermediate the light harvesting dome and the filter. This filter can be frosted or patterned such as with hemispherical or pyramidical crests or valleys. This arrangement makes the change between bleached and colored phases of the filter very apparent to building's occupants and increases the visual attractiveness, which is to say the aesthetics, of the product. Further, since the light travels through two independent panes (the outer dome and the diffuser) before reaching the chromogenic filter, the opportunity for the UV rejection is high. One or both of these can be made out of plastics which block the UV light, one of these may block out lower wavelengths of UV (typically the outer dome) and the other one the longer wavelengths in UV, or both may even be similar, and this will result in a higher UV attenuation. The second filter should preferably be located close (within 12 inches) to the chromogenic filter and may be flat or curved. In a preferred embodiment this filter has one or more of the following characteristics:

Is curved like a part of the sphere, with the concave side facing the chromogenic filter,
  Is patterned,
  Is made out of plastic, preferably acrylic or polyearbonate, and
  Has its edges close to (within 6 inches) or touching the chromogenic filter.

Automatic adjustment of the transmitted light occurs when the filter control circuit (the controller) includes a light sensor that responds to fluctuations in ambient light and adjusts the filter's transmittance accordingly. The light sensing ability of the filter control circuit is provided through a light sensor that generates a signal related to the amount of light incident on it. Once a set-point is chosen, the filter control circuit adjusts filter transmittance by modifying the filter signal so that the signal from the light sensor remains at the value set by the user. Preferably such a sensor should be located below the chromogenic filter. This way the sensor can provide feedback to the controller on the intensity of the light passing through the filter. The filter control circuit can optionally institute filter maintenance procedures such as purposefully bleaching or cycling the filter during periods of non-use to maintain the filter's performance. This maintenance may also be done by the controller itself after the filter has been activated for a pre-set period. The automatically adjusted chromogenic filter can readily be integrated into a HVAC system for a building.

Used in association with a chromogenic filter, the mechanical shutter provides coarse control over the intensity of the emitted light. Alternatively, the mechanical shutter can provide a means of light intensity control and the chromogenic filter the means for color control. When closed, the shutter blocks substantially all incoming light. When open, the shutter allows substantially all incoming light to pass. Used as the sole light intensity modifying element, the shutter can provide complete control of light transmission through the skylight providing varying degrees of brightness from complete blockage of light to full brightness. The shutter is preferably coated with diffusive or reflective material or possesses such a surface. It can also serve as a base for solar cells as discussed below.

The internal lamp allows the skylight to provide illumination after dark. If the lamp is positioned below the mechanical shutter, a reflective coating or finish of the closed shutter causes lamp light traveling away from a building's interior to be reflected back towards the interior. The lamp control can have simple on/off control or can incorporate a dimmer. Under control of the intensity sensor of an automatic control circuit, the lamp can supplement transmitted light on overcast days.

Control of the light improves its quality and suitability for diverse interior activities requiring different lighting conditions. The increased control helps prevent undesired brightness or darkness inside the building.

The chromogenic filter generally is constructed of one or two, substantially transparent, rigid substrates. For single substrate construction, multiple coating layers are used, whereas in two-substrate constructions, fewer coatings may be used. The two-substrate constructions are sealed around the edge, and define an enclosure for and electrical contact with the chromogenic material. Electrical contact is provided through a conductive film bonded to surfaces of the substrate.

Certain embodiments of skylights constructed in accordance with the invention provide for softening or reducing transmitted light by modifying or adding components to the skylight to increase diffuseness of the light. It can be accomplished using diffusers, by applying diffusive coatings to the chromogenic filter, or by increasing the light-scattering ability of the chromogenic filter itself. Coating the interior surfaces of the skylight with diffusive paint or other diffusive material increases the diffuseness of the light. Alternatively or in connection with that, diffusers, i.e. translucent lenses, are used to increase the diffuseness of the light. Furthermore, in some embodiments of the invention, the chromogenic filter supplements or may provide substantially all of the skylight's light-diffusing ability.

To alter the diffuseness of the filter, the filter can be coated or laminated with a diffusive material coating or layer, or the chromogenic material can be modified to be more diffusive. For the purpose of coating or laminating, suitable coating materials include polyester, alkyds, polyurethanes, acrylics, epoxies, silicones applied, for example, to the outside surface of the filter with one or more of silicates, silica, titania, zinc oxide, clays and ceramics dispersed therein. Modification of the chromogenic material for diffuseness primarily consists of mixing a diffusion imparting material into the chromogenic material. The filters may also be coated with thenmochromic materials, which become more opaque or acquire a color as their temperature rises.

In one preferred embodiment, the outer dome is comprised of a first material which carries dispersed particles of a second material. As temperature varies, the refractive index of one or both materials changes so that the light transmissive qualities of the layer varies. These materials are thermochromic where their light transmission property changes with temperature. The dome may also be made out of the photochromic material. Another light modifying addition to one or more elements of the skylight that transmit light is antireflective coatings to increase the transmission of light incident on the element so-coated.

Thermochromic or a photochromic material coating can be applied to the outer surface of one of the chromogenic filter substrate or one of these substrates may themselves be made out of one of these materials. All of these schemes allow the outer dome to have thermochromic and/or photochromic properties which can be used in conjunction with the chromogenic filters.

To provide a skylight that minimizes UV light transmission while not unduly lowering visible light transmission, UV absorbers that do not significantly absorb visible light can coat the filter, can be mixed with the chromogenic filter, or can be added to the light diffusers or the dome. Types of UV absorbers or filters that can be used are clear plastics that cut off or absorb strongly in the UV region of the solar spectrum which is from about 290 nm to 400 nm. The cutoff wavelength of the filter should be in the range of 380 to 400 nm. This means that the transmission of the filter is 30% or lower at this wavelength and continues to decrease below this wavelength, so that it transmits less than 5% (preferably less than 1%) 20 nm below the cutoff point. The filter should keep its absorption below 1% to at least down to 290 nm, preferably down to 250 nm. An example of the preferred filter is. Examples of such plastic filters are Acrylite OP-3 from Cyro Industries (Rockaway, N.J.) in a thickness range of 0.125 inch, UV filter film (catalogue number 394267) from Edmund Scientific (Barrington, N.J.), Flexmark OA 200 UV, V22 (from Flexcon, Spencor, Mass.), CLS-200-XSR from Madico (Tempe, Ariz.). Further, these filters may be embossed☐m with light diffusing patterns and or have infrared blocking properties. Counting the outer dome the above describes up to two UV filters or light transmission panes are placed between the chromogenic filter and the outside environment, however, one may place more filter elements to provide higher UV rejection, patterns, colors, etc.

In one preferred embodiment, solar cells partially or fully provide the electrical requirements of the skylight. The solar cells can be roof mounted, mounted on the outward portion of the skylight (not blocking the light dome), or mounted in the interior of the skylight (meaning inside of the outer dome).

For convenience in repair, cleaning and filter replacement, an innermost diffuser capping the interior of a light tube is readily removable to allow access to the filter, which is also removably mounted and has electrical jacks or connectors easily disconnected. The chromogenic filter is located within reach of the interior end of the skylight and any electrical connections are designed for quick and convenient disconnection and reconnection. The control circuit is housed in a housing affixed to the light tube and is accessible through a hinged door that is formed as a part of the light tube interior surface. The door preferably has the same reflective or diffusive surface qualities as the interior surfaces of the tube. In a conventional skylight such controller boxes can be accommodated within the skylight frame or are mounted between the dome and the chromogenic filter or mounted outside the skylight which may be weather protected.

The above and further objects and advantages of the invention will be better understood with respect to the following detailed description preferred embodiments considered in combination with the several figures of the accompanying drawings.

BRIEF DESCRIPTION OF THE DRAWINGS

FIG. 2(a) is a schematic block diagram of a controllable skylight and its controls.

FIG. 2(b) is a schematic block diagram of an alternative embodiment of a skylight and its controls.

FIG. 3 is a block diagram of a skylight installation with a rechargeable battery recharged from a solar cell, timing, temperature and light sensing feedback and control circuits.

FIG. 9(a) is schematic illustration of an alternative skylight with floating mid-section for serviceability.

FIG. 9(b) is a further view of the skylight of FIG. 9(a) with the floating section raised.

FIG. 10 is a diagrammatic cross-section view of a further skylight embodiment with electrochromic filter visible from the interior of the building.

FIG. 11 is a diagrammatic cross-section view of a further embodiment of the skylight of FIG. 10 with a concave interior diffuser.

FIGS. 12(a)–12(c) are schematic diagrams of a control circuit for an electrochromic filter for use in skylights according to the invention.

FIGS. 13(a) and 13(b) are diagrammatic illustrations of a muscle wire activating device for a shutter.

FIG. 14 is a diagrammatic illustration of an alternative shutter and muscle wire activating device.

FIG. 15 is a diagrammatic illustration of another alternative shutter and muscle wire activating device.

FIGS. 16(a) and 16(b) are diagrammatic illustrations of yet another alternative shutter and muscle wire activating device.

DETAILED DESCRIPTION OF THE PREFERRED EMBODIMENT

Figure 1:
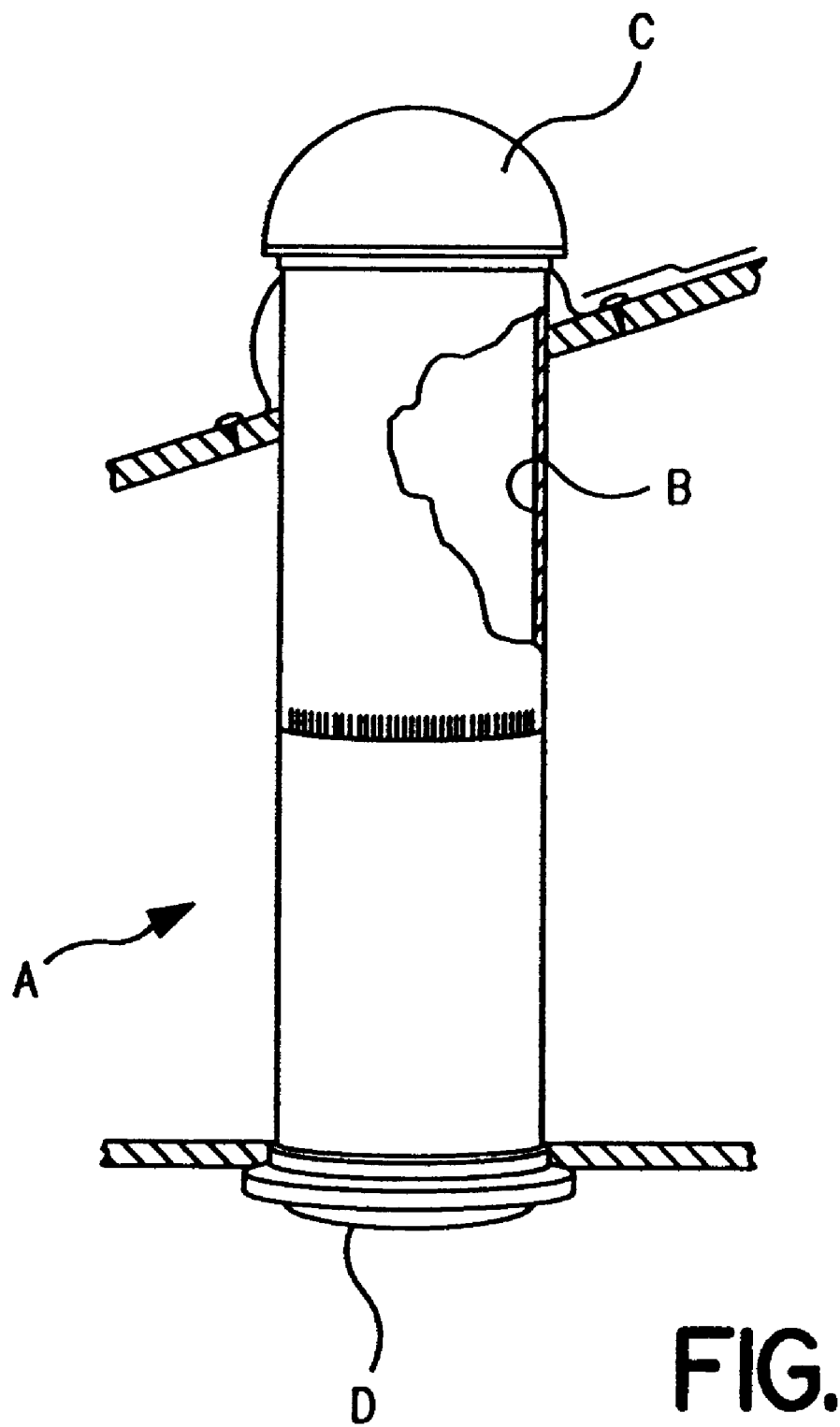
FIG. 1 is a diagrammatic illustration of a prior art light tube skylight.

In FIG. 2(a), a tubular skylight 100 for a building has an outer dome 160 for light harvesting, a light tube 105, an interior light diffuser 130 that provides uniform light distribution in a room, and a chromogenic filter 110. The skylight has an optional lamp 180 and mechanical shutter 200. The skylight may include as well an optional secondary diffuser 135. The filter 110 has a control circuit 420. The optional lamp 180 has a lamp control 410. The shutter 200 has an actuator 201 and a shutter control 430 through which it is controlled. These controls 410, 420, and 430 may employ various sensors as discussed below, including a light sensor 230 connected to the filter control circuit 430. The controls can be independent or combined in one controller unit 120.

A user communicates with the control circuit 120, and therefore with filter control circuit 420, the lamp control 410, or mechanical shutter control 430, and receives information through a user interface 450. The interface 450 optionally includes an indicator 452. A LED 453 signals the reception of a command by a user control/receiver 440 from a remote control transmitter 480. The indicator 452 uses an array of LEDs 454 arranged to simulate a bar graph to indicate the degree of darkening of the filter 110.

The skylight 100 is optionally adapted to use power generated by solar cells 305 or by one or more batteries or fuel cells. (Preferably, as shown in FIG. 3, the solar cell 360 is connected to a rechargeable battery 361, which provides the power to the chromogenic filter 363.) The user control/receiver 440 of FIG. 2(a) receives commands from the remote control/transmitter 480 and transmits appropriate control signals to the filter control 420 and, when present, the lamp and shutter controls 410 and 430.

A simplified embodiment of the invention is illustrated in FIG. 2(b). There, a skylight 100' includes a dome 160' and a diffuser 130'. A chromogenic filter 110' varies the light passed through the skylight 100' without the addition of the shutter 200 and lamp 180 of FIG. 2(a). Again, a filter controller 420' varies the transmittance of the filter 110' under the control of an interface 450'. Here the user interface 450' is hardwired to the filter control 420' and simply employs an off-on switch 456 and manually controlled rheostat 457. Here too, the filter control circuit 420' can be powered from the 115 v mains, solar cells, or rechargeable or non-rechargeable batteries.

Chromogenic Filter

Various configurations of filters using electrochromic materials are known. A number of multiple layer configurations are illustrated in FIGS. 1A through 1E in the above-mentioned Patent Cooperation Treaty (PCT) patent application Ser. No. PCT/US97/14558, published under International Publication Number WO 98/08137 on Feb. 26, 1998, and which is incorporated herein by reference.

Figure 18:
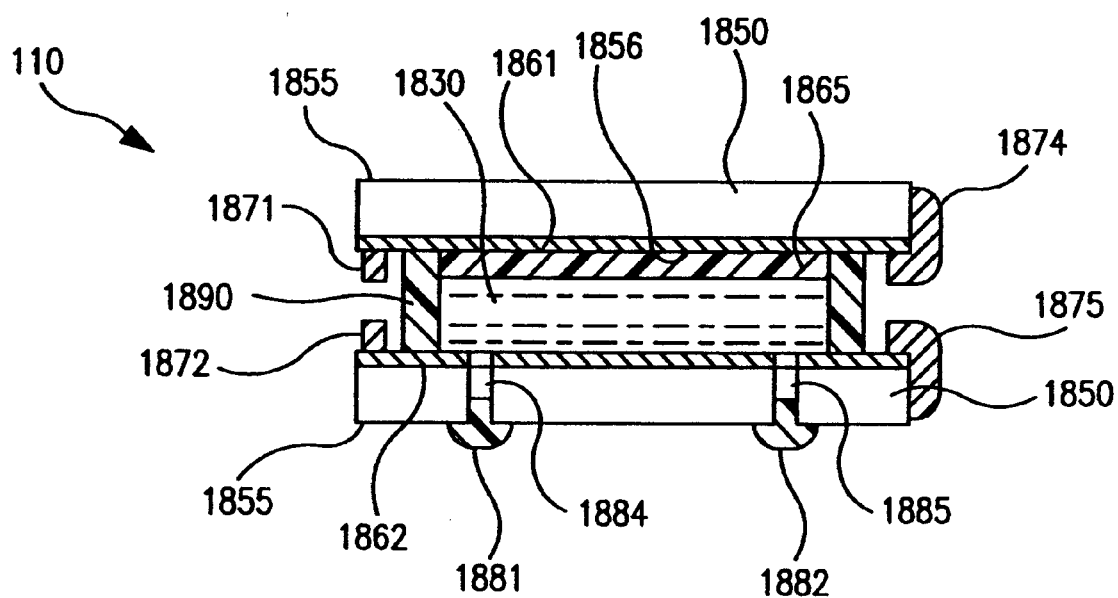
FIG. 18 is a diagrammatic cross-sectional illustration of an electrochromic filter.

Suitable for use as the chromogenic filter 110 or 110' of FIGS. 2(a) and 2(b), a particularly preferred electrochromic filter 1800 is illustrated in FIG. 18. It has the general construction of the electrochromic filter of FIG. 1B of the aforementioned published PCT application. It includes a pair of transparent substrates 1850 with a pair of transparent conductive (and optionally ion-insertive) coatings 1861 and 1862, deposited on them. An electrochromic layer 1865 is supported on the transparent conductive coatings 1861 in contact with an electrolyte 1830. Preferably, the electrolyte 1830 has redox additives, dissociable salts, UV stabilizers and viscosity modifiers. A pair of bus bars 1871 and 1872 are connected with a pair of connectors 1874 and 1875, respectively. The connectors 1874 and 1875 cooperate with mating connectors supported on the light tube for easy electrical connection upon installation of the filter. A pair of caps 1881 and 1882 close a pair of fill holes 1884 and 1885 used to introduce the electrolyte 1830. An adhesive sealant 1890 completes the enclosure of the electrolyte between the electrode 1862 and the electrochromic layer 1865. As discussed in the copending applications cited above, examples of coated substrates with transparent but conductive coatings TEC8 and TEC 15 from Libby Owens Ford (Toledo, Ohio), or Indium Tin Oxide (ITO) on a substrate to form a conductive film. Another example of transparent conductor is TCO12 from AFG Glass (Kingsport, Tenn.) which provides high haze in the finished device. Electrical connection of the filter control 420 (discussed below) is made to the substrates using any convenient manner of electrical connection known in the art, but preferably and conveniently the built-in connectors 1874 and 1875 of FIG. 18 or other easily connected and disconnected electrical connectors.

By varying its transmittance, the chromogenic filter 110 varies the transmission of light through the skylight 100 from the light harvesting dome 160 to the diffuser 130. As used here, transmittance is the percentage of light that passes through the skylight 100 whether infrared, visible or ultraviolet. The transmittance-varying part of a chromogenic filter 110 is the chromogenic material, the layer 1865 in FIG. 18. The chromogenic material has at least two states: bleached and colored. The bleached state is the most transparent or transmissive state. The colored state encompasses all other degrees of translucency of the filter. As used here, the colored state includes white and black, but not clear. As discussed above, a variety of different chromogenic material technologies exist. Any of the chromogenic materials of these different technologies is suitable for use in embodiments of the present invention if the material's transmittance varies sufficiently from the bleached and to the colored states as discussed with respect to the ranges set forth below.

Application of a potential across the conductive coatings 1861 and 1862 via the bus bars 1871 and 1872 (FIG. 18) of an electrochromic filter sets up a system in which the potential drives a color-producing reaction and reaches a steady state at a given temperature. That steady-state means the filter has reached a transmittance that does not vary with time. For a given temperature, a particular potential produces a particular transmittance. Alternatively, the potential can be applied to the filter for a set amount of time. This will cause the color to increase based upon the colored constituent's formation rate and the amount of time the potential is applied. Depending on the kind of chromogenic filter, when the potential is removed, or lowered, or reversed, the filter begins to bleach. For those electrochromic devices where the filter bleaches upon the removal of power, the colored transmittance of the filter can be preferably selected by controlling the ratio of the potential's on-time to off-time and the applied coloration voltage. This pulsed method is preferred because aging and filter temperature least diminish the filter's operation. When pulsed activation is used, the instantaneous transmittance varies depending upon where in the pulse sequence the system currently is located. While the potential is turned on, the transmittance falls, and while the potential is turned off, the transmittance rises. As long as the overall transmittance change is less than substantially 5%, but preferably 2%, the user perceives a steady-state transmittance. A control circuit is described to achieve this. Since the change rate is temperature dependent, the circuit has a switching frequency control 1805, in FIG. 3, that automatically compensates by switching faster at higher temperatures than at the lower temperatures.

A choice of one chromogenic technology in this invention over another mandates the filter control technology needed. For example, choosing liquid-crystal material as the chromogenic material in this invention necessitates much different filter control circuitry than does choosing electrochromic materials. While most chromogenic materials will function and can be used in accordance with this invention, electrochromic materials are preferred. Particularly preferred are those electrochromic devices which modulate light both in visible and the infra-red part of the solar spectrum. Thus EC devices with electrochromic coatings which comprise of at least one of transition metal oxide and conductive polymers are preferred. Preferred examples of a transition metal oxide is tungsten oxide and that of conductive polymer is polyaniline. Any electrochromic material known in the art is suitable for use in the chromogenic filter 110 of the preferred embodiment of the present invention. Temperatures up to 70C have been measured on the electrochromic filters placed in a skylight during summer months in Tucson, Ariz. It is preferred that chromogenic filters capable of functioning up to these and preferably up to 80C are used in these applications.

An extremely simplified embodiment of the invention is illustrated in FIG. 2(b). There, a skylight 100' includes the dome 160' and a diffuser 130'. The filter 110 varies the light passed through the skylight 100' without the addition of the shutter 200 and lamp 180 of FIG. 2(a). Again, a filter controller 420' varies the transmittance of the filter 110 under the control of an interface 450'. Here the user interface 450' is hardwired to the filter control 420' and simply employs an off-on switch 456 and manually controlled rheostat 457. Again, the filter control circuit 420' can be powered from the 115V mains, solar cells or rechargeable batteries.

In a specific embodiment, the chromogenic filter 110 provides control over the intensity of light emitted from the skylight 100. Using the user control circuit discussed below, the user chooses a point (set-point) that corresponds to the brightness the user desires by setting the filter control circuit 420 of FIG. 2(a) or 2(b) to a particular darkness of the filter 110. Once the set-point is chosen, the filter control circuit 420 monitors the intensity of the light transmitted through the filter 110 by monitoring the light sensor 230. This intensity will rise and fall as external factors, such as the passage of clouds influence the incident light. The filter control circuit 420 modifies the transmittance of the filter 110 moment by moment using the light sensor 230 to maintain the selected intensity. Additionally, the transmittance of the filter 110 is somewhat dependent on the temperature of the electrolyte and other factors. As these factors change, the filter control 420 modifies the filter signal to maintain intensity at the set-point. As generally indicated in FIG. 3, a time delay 1820 can be built in the control so that it does not actuate the filter in response to fast changes, e.g., a moving shadow of a plane over the skylight or fast moving clouds.

Optical Qualities

It is preferred that the chromogenic filter 110 have a minimum transmittance in its bleached state of greater than substantially 40%, and more preferably still, greater than 60%. In the colored state, the transmittance of the chromogenic filter 110 should be less than substantially 25%. A preferred embodiment has a colored state transmittance of less than substantially 10%. The higher the variability between colored and bleached state transmittance, the greater the ability of the chromogenic filter 110 to modulate light. All of these transmittance values relate to photopic measurements. So that the energy efficiency of the skylights and user comfort can be enhanced, it is further preferred to use a chromogenic filter 110 that can modulate light in most of the solar region (the region of the visible and the infra-red electromagnetic spectrum emitted by the Sun, typically from 400 to 2500 nm. in wavelength where 400 to 700 nm is the visible part and 700 to 2500 is the infrared part. Of the infrared part most of the solar energy is encompassed up to 2000 nm). For solar transmittance, the preferred bleached state transmittance is greater than substantially 30%, and the colored state transmittance is less than 10%.

Figure 4:
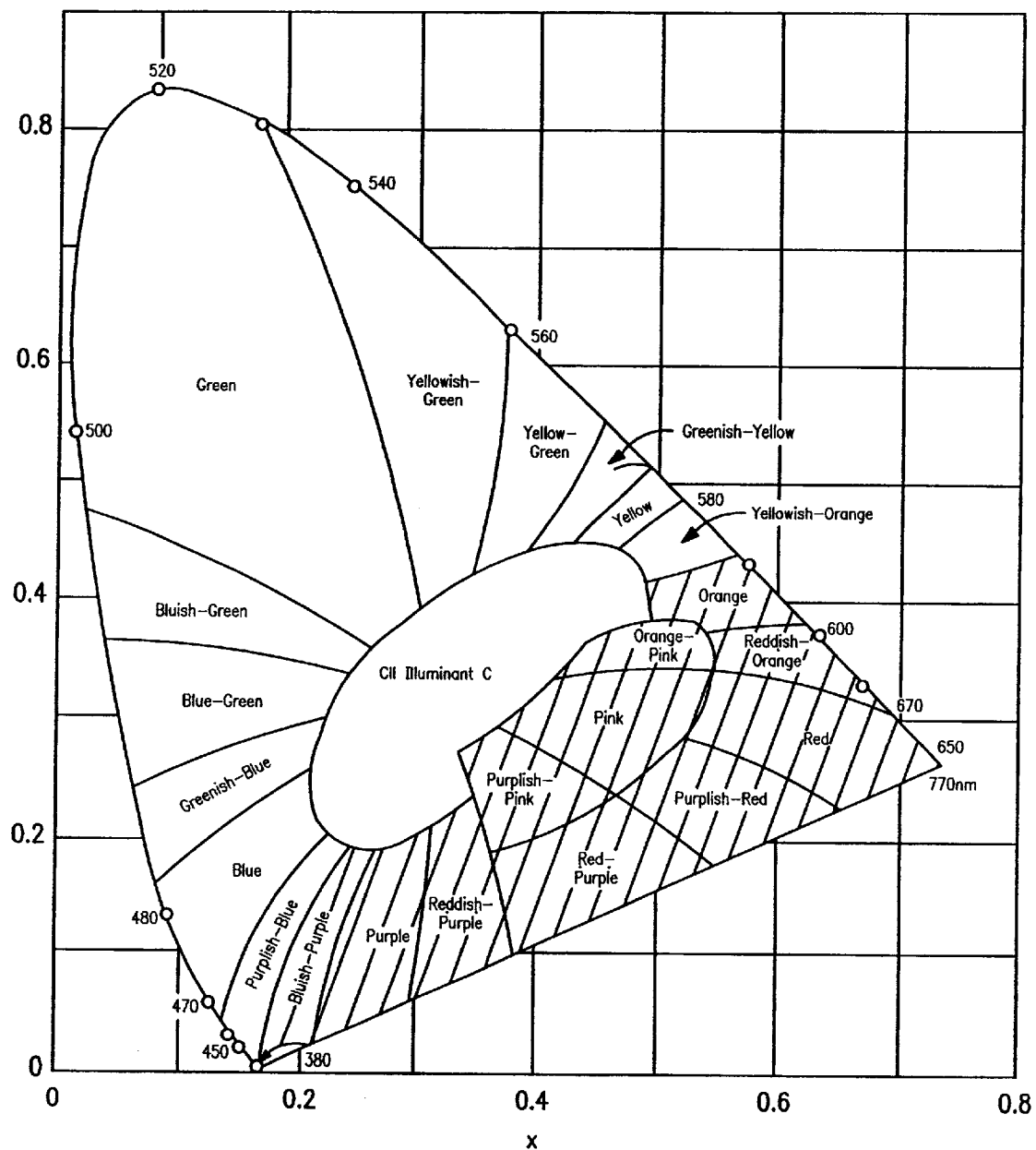
FIG. 4 is a chromaticity diagram.

The tint of the chromogenic filter 110 in the bleached state affects the color of the light passing through the skylight 100. A slight yellow/straw tint adds the appearance of warmth to the light entering a room. The preferred tint of the chromogenic filter 110 in the colored state is one of neutral (gray), bronze, blue, or green. The chromogenic filter 110 should be chosen so that the color coordinates of the filter's color in both the colored state and bleached state are in the non-hashed region of the chromaticity diagram of FIG. 4 (CIE 1931, 2 degrees). For conventional skylights with an outer plastic bubble, a preferred combination is a bronze colored or a diffusing plastic bubble with an electrochromic filter which colors to a blue, green or any shade between these as seen in FIG. 4 above. A bronze color or diffused white plastic filter with visible light transmission of 15 to 60% is preferred. When a bronze colored outer plastic is combined with a blue or a green coloring chromogenic filter, the result of this combination is more neutral colored light transmittance. With a white dome and a blue coloring filter results in a perception that one is looking at a clear blue sky in the colored state. The combination of colors is more completely explained in a patent application "Chromogenic Glazing For Automobiles and Display Filters" Ser. No. 09/565999, incorporated herein by reference. For some applications it may be desired to coat the outer bubble with a material or to provide a filter located below or above the outer dome which reflects the infra-red radiation.

Harsh or glaring light is avoided in an interior served by a skylight by increasing diffuseness of the light through the skylight. There are a number of ways to achieve a desired diffuseness of light from the skylight 100. These may be used in any combination or alone. Diffuseness can be quantified by measuring haze, using for example, a "Hazeguard plus" from Paul N. Gardner Company (Pompano Beach, Fla.). Additionally, a calorimeter, ColorQuest II or Ultrascan XE made by Hunterlab (Reston, Va.) can be used to measure haze. These instruments can measure haze of any of the light-transmitting skylight components, including the chromogenic filter 110.

One of the ways is to use the outer dome which scatters or diffuses light. In some skylight systems this is not preferred as it blocks a large proportion of the visible light from entering into the skylight. One way is to make the dome out of a thermochromic material so that it is only when the temperature is high (which is typically in the summer) that it will block some of the light. Another way to increase the diffuseness of the light is to cause the chromogenic filter 110 to scatter or diffuse light. In this case, the target haze factor for the chromogenic filter 110, itself, is 2% or more. The preferred haze factor for the chromogenic filter is greater than 10%. Several ways of increasing the haze factor of a chromogenic filter 110 are useful for this purpose— using surface conductors 1861 on the substrates 1850 that increase haze, adding light-scattering particles to the electrolyte 1830, roughening at least one surface 1855 of one of the substrates 1850, coating the outer surface 1855 of a substrate 1850 with a diffusing material, or employing a thermochromic laminate in the chromogenic filter. These techniques may be employed individually or in combination.

Many otherwise transparent conductors increase the haze factor of the substrates 1850. Because they have a haze factor greater than 2%, for example, TEC8 from Libby Owens Ford (Toledo, Ohio), TCO12 from AFG Glass (Kingsport, Tenn.), are preferred conductors for the conductive coatings 1861. The transparent substrates 1850 may or may not have anti-iridescent coatings between the substrate and the conductive coatings.

As for increasing the haze factor of the chromogenic filter 110 by mixing light scattering particles into the electrolyte 1830, the light scattering particles are typically larger than 0.5 microns and have a refractive index different from the electrolyte. To adequately increase the haze factor, the refractive index difference between the electrolyte and the scattering particles should be greater than substantially 0.02 and the scattering particles should not be soluble in the electrolyte. Some inorganic materials that meet these requirements are silicates, silica, titania, zinc oxides, clays, ceramics and glasses.

As for the aforementioned roughening of one or both surfaces 1855, 1856, of one or both substrates 1850, roughening includes frosting, etching, sandblasting or any other known technique suitable for this purpose. Such treatment can be applied to the outer surfaces 1855 of the substrates 1850 either before or after assembly of the filter 110.

Instead of or in addition to mechanically roughening the outer surface 1855 of the substrate 1850 or any of the previously mentioned means of increasing diffuseness, the outer surfaces 1855 310 of one or both the substrates 1850 can be coated or laminated with a material that has diffusive properties. These coatings or laminations can be polymeric or inorganic. Some examples of polymers that are useful in this manner include polyesters, alkyds, polyurethanes, acrylics, epoxies, and silicones. Useful inorganic materials include silicates, silica, titania, zinc oxides, clays, ceramics and glasses. These lists of polymers and inorganic materials are not exhaustive. The requirements for a diffusive coating or laminate for this purpose are that (1) the material scatters or diffuses reflected or transmitted light, (2) the material is stable to the processing required for its use, and (3) the material is stable in use. These coatings can also have other components that improve their properties. For example, adhesion promoting agents (e.g., silanes), UV blockers, and pigments or dyes, are added as needed or desired. Coating the material to the substrate 1850 can be accomplished by any appropriate method known in the art including spraying, dipping, brushing, roller coating, gravure, screening, etc. As with roughening, the treatment can be applied to the outer substrate surfaces 1855 either before or after the chromogenic filter 110 has been assembled. Likewise, a polymeric laminate with desired haze factor can be bonded to one or both outer surfaces 1855 of the substrates.

One further way that the haze factor of the chromogenic filter 110 may be increased is by constructing the substrate 1850 with a thermochromic material coating the substrate's surface 1855 and/or 1856 with thermochromic material, or laminating a thermochromic layer to the substrate 1850. Thermochromic materials may change either their color with temperature or their IR transmission or haziness. Preferred thermochromic materials for the present purpose respond to temperature increases by changing from substantially transparent to translucent or clouded. Preferably, the thermochromic material has a transition temperature of between substantially 30 and 70 degrees C at which it changes between transparent and translucent. A preferred thermochromic material shows a transmittance change of more than 5% at a wave length of 550 nm. between substantially 30 and 70 degrees C when measured on a UV 3100 spectrometer by Shimadzu (Columbia, Md.), and more preferably still a change of more than 20% in transmittance under similar conditions and measured by that instrument.

A material that varies its light transmitting quality with temperature can be made by using a known technique for making a two-phase material. A rigid polymer is impact modified (improved) by adding a second phase to the polymer matrix. Typically, the second phase has rubbery characteristics. The technology to do this is well known. See "Rubber Toughened Plastics," Advances in Chemistry Series #222 and 233, American Chemical Society, 1989, and 1992, respectively, C. K. Riew, editor. For a clear polymer to transform into opaque state with increasing temperature, the difference between the refractive index of the matrix and the second phase should be similar in clear state and then become dissimilar at elevated temperature. It is preferred that in the clear state the refractive index difference is less than 0.005, preferably 0.001. When the temperature increases, the rate of change in the refractive index of the two phases are different which causes a wider difference in the refractive index and hence the opacity. In the clear state, the refractive index of the two phases can be matched by changing composition of at least one phase. For example, an acrylic polymer matrix may be modified by making a copolymer, e.g., additing styrene, acrylonitrile or other monomers to the acrylic monomer (e.g., methylmethacrylate). After polymerization, the refractive index of this copolymer as compared to polymethylmeth acrylate will be different. Similarly, the rubbery phase could be modified by adding these and other monomers to butadiene, isoprene, isobutylene, chloroprene, etc., and grafting polymeric components to both change the refractive index and ensure that it is compatible (miscible) with the matrix. One could choose materials so that either there is a transition during heating in one of the phases, or they each have diverse changes in refractive index (RI) with temperature. The materials (matrix and the second phase) could be polymerized together, sequentially, or blended after polymerization, such as in the molten state using a twin screw extruder.

Also, one may have a second phase which is smaller than the wavelength of light, preferably less than 300 nm, but with a dissimilar refractive index. Since light is not effectively scattered by small particles, the material will appear clear. When the temperature increases, the second phase agglomerates, giving particles greater than 500 nm in size which will lead to light scattering and thus opacity. Alternatively, as the temperature rises the dome material which is one phase separates into two or more phases which have different refractive index and this gives rise to scattering of light (e.g., see "Materials for Intelligent Sun Protection Glazing", Arno Seebooth, et.al., in Solar Energy Materials and Solar Cells, Vol. 60 (2000) p 263).

One may even combine both of the above methods to optimize the material performance.

Figure 5:
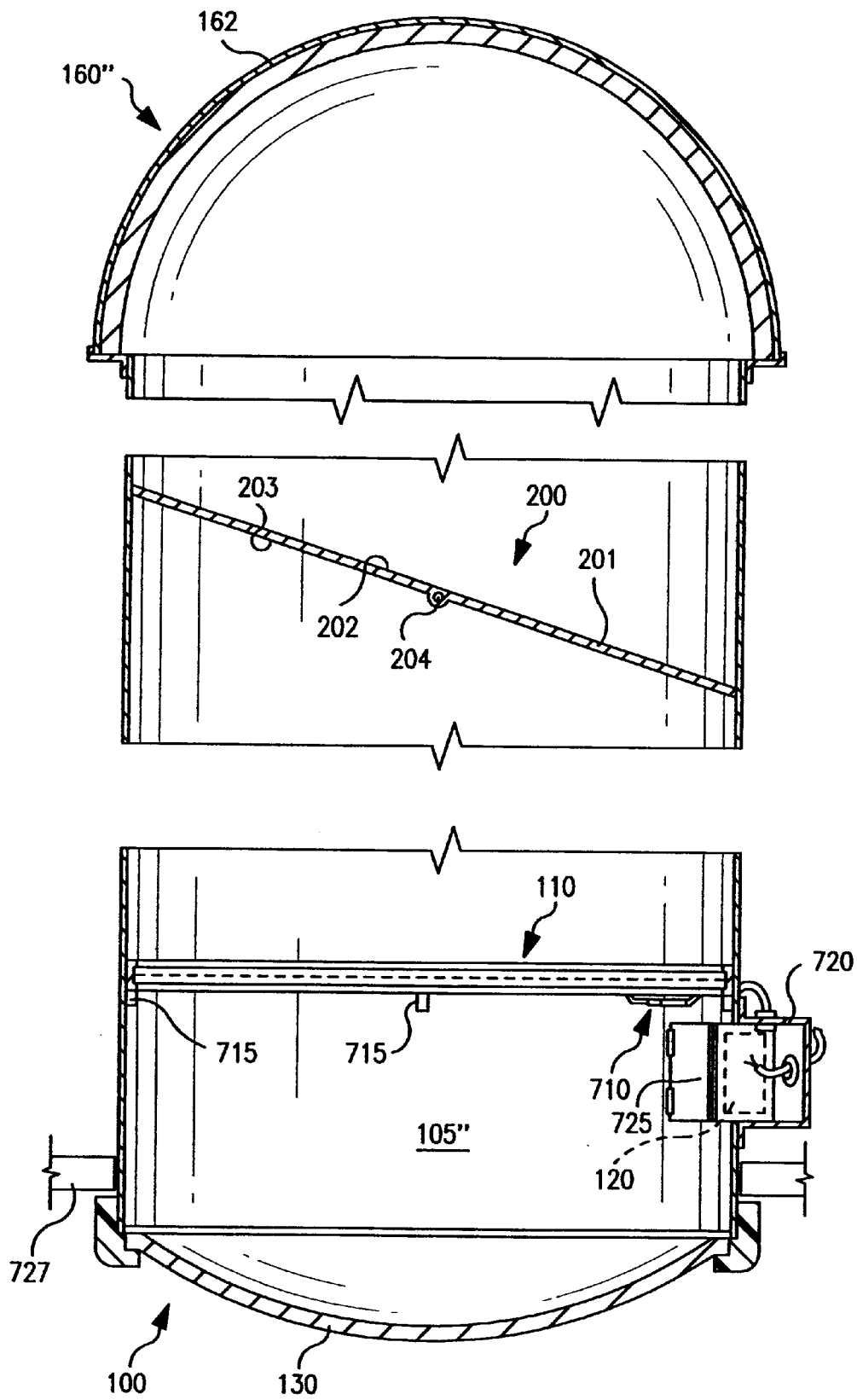
FIG. 5 is an enlarged, fragmentary, cross-sectional view of a skylight suitable for use in the installation of FIG. 2(a) or 2(b).

Instead of coating the chromogenic filter with a thermochromic material, an outer dome 160 may be employed that is either made of or coated with a thermochromic material 162 as shown in FIG. 5.

Alternately, the outer light collection dome may be designed with ridges and patterns to reduce specular transmission of light which it harvests and transmits through the skylight. Further, the outward-facing surface of the chromogenic filter may be laminated with e.g. a plastic filter, which blocks the UV light. Examples of such preferred plastic filters are Acrylite OP-3 from Cyro Industries, UV filter film (catalogue number 394267) from Edmund Scientific (Barrington, N.J.), Flexmark OA 200 UV, V22 (from Flexcon, Spencer, Mass.), and CLS-200 XSR from Madico (Tempe, Ariz.). These films may even have properties to reflect solar infrared radiation radiant solar energy), as with Madico films. These films can be applied using dry lamination or other technology used for example in window tinting for buildings and automotive glass. Lamination with plastic films on one or both sides also provides further protection from accidental mechanical breakage. In addition, those electrochromic devices that use molybdenum oxide, tungsten oxide or a doped tungsten oxide and/or a molybdenum oxide coating as an electrochromic layer in the filter device have an added advantage to regulate the IR transmission of solar radiation with little effect on visible transmission. This can provide users relief from radiated IR transmission (in the form of heat) while keeping high the illumination from the visible part of the solar radiation.

In a skylight, another way of increasing diffuseness of transmitted light discussed includes introducing an intermediate light diffuser 135 as shown in FIG. 2(a). This can be located between the dome 160 and the filter 110. This light diffuser may be thermnochromic.

The skylight 100 should be constructed to avoid intensely focused spots of sunlight on the chromogenic filter 110 caused by the light diffusers or other components of the skylight. Particularly, when the filter is in the colored state, intensely focused sunlight can lead to non-uniform temperature variations on the filter that can adversely affect its operation. Avoidance of these hot-spots reduces the probability of damage to and mechanical failure of the chromogenic filter 110 due to thermal expansion mismatches. The preferred surface temperature variations of the illuminated portion of the substrate 1850 should be less than substantially 60 degrees C regardless of whether the filter 110 is in the bleached state or the colored state. More preferably, the temperature variation should be less than 20 degrees C.

The overall diffuseness of the skylight can be increased by painting, coating or treating all or part of the interior of the skylight for diffusive reflection. Paints containing titania are widely available, but any diffusive material coating or surface treatment, as discussed above will function in this fashion. All or any interior portions of the skylight tube from which light reflects are usefully treated for diffusive reflection.

Diffusion is accomplished in any of the ways described above. The diffuser can be used as the sole diffuser or with one or more of the diffusion contributing means described above.

At least one or more of the surfaces of the chromogenic filter and/or the interior diffuser or the exterior dome may be also coated with antireflective coatings (single layers of low refractive index materials (flouropolymers, silicones and fluorides), gradient index layers or multiple layers of varying refractive index) to increase the light throughput through the system. These coatings may also have UV blockers incorporated in them. Materials, properties and thickness' for these layers can be found in any standard text on the subject such as "Design of Optical Interference Coatings" authored by Alfred Thelen, McGraw Hill Book Company, 1988.

Controls

The controller 120 or 120' contains at least a filter control circuit 420 or 420' and a user interface 450 or 450' (see FIG. 2(b)). The controller can also contain one or more of an indicator 452, a lamp control 410, and a mechanical shutter control 430 (see the controller 120 of FIG. 2(a)). The user interface 450 or 450' must be capable of communicating the control information to the filter control circuit 420 or 420', as well as the lamp control 410, and the shutter control 430 and actuator 201 when these controls are part of the controller.

The principal function of the filter control circuit 420 or 420' is to supply a filter signal to the chromogenic filter 110 or 110'. The principal control function of the lamp control 410 is to provide power to the lamp 180. The principal function of the mechanical shutter control 430 is to provide a shutter control signal to the shutter actuator 201.

Figure 6:
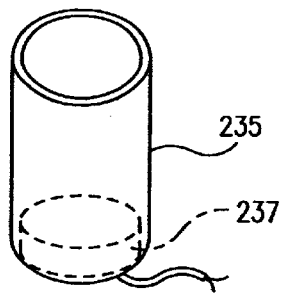
FIG. 6 is an enlarged perspective view of a sensor of the skylight of FIG. 2(a).

The light sensor 230 allows the filter control 420 to detect intensity changes in the light transmitted through the chromogenic filter 110 so that a constant overall brightness in a room interior area can be maintained. The light sensor 230 optionally, but preferably includes an upward opening sleeve 235, as seen in FIG. 6, to increase the sensitivity of an internal photocell 237 to light entering the skylight 100 as compared to light reflected from inside the building up into the skylight. In addition to monitoring the light intensity for regulation, the filter control circuit 420 has optional functions that are carried out either during the day or at night. The control can use the light sensor 230 to determine daytime or nighttime or it can use a separate day-night sensor similar to the sensor 230. When the light sensor 230 or the day-night sensor indicates to the controller 120 that no light is coming through the skylight 100, the filter control circuit 420 suspends sending the filter signal. This allows the electrochromic filter to relax to its neutral state. The light sensor 230 or day-night sensor can also allow the filter control circuit 420 to determine the appropriate time to begin filter maintenance bleaching. Filter maintenance bleaching is the known process by which a filter signal is applied to the filter 110 pursuant to a schedule to cause, after a period of time, any colored constituents to revert to their previous uncolored state. The process is preferentially initiated at night when it will go unnoticed by the user. Both the day-night sensor and the light sensor 230 are positioned with unobstructed paths to the outer dome 160 of the skylight 100. Both are also positioned to avoid casting shadows into the building interior. The maintenance procedures may be temporarily suspended automatically if this will interfere with the lamp operation when selected by the user.

The simplest functions of the controller 120 are implemented using an analog circuit, such as an amplifier with feedback control. Analog and digital control circuits responsive to a feedback signal, such as that from the light sensor 230, to maintain or to adjust output to maintain a setpoint are well known in the art of electrical controls and can be used here. Most preferably, the controller 120 contains a programmable micro-controller as is well known in the art. Use of such a micro-controller allows for maximum flexibility of function with minimum cost. The circuitry for both of these and further embodiments is described in the aforementioned Busbars for Electrically Powered Cells, U.S. provisional patent application Ser. No. 60/091,678 filed Jul. 2, 1998 and U.S. patent application Ser. No. 09/347,807, filed Jul. 2, 1999, now U.S. Pat. No. 6,317,248. A further exemplary electrochromic filter control circuit is described below in reference to FIGS. 12 (a), (b) and (c).

Figure 7:
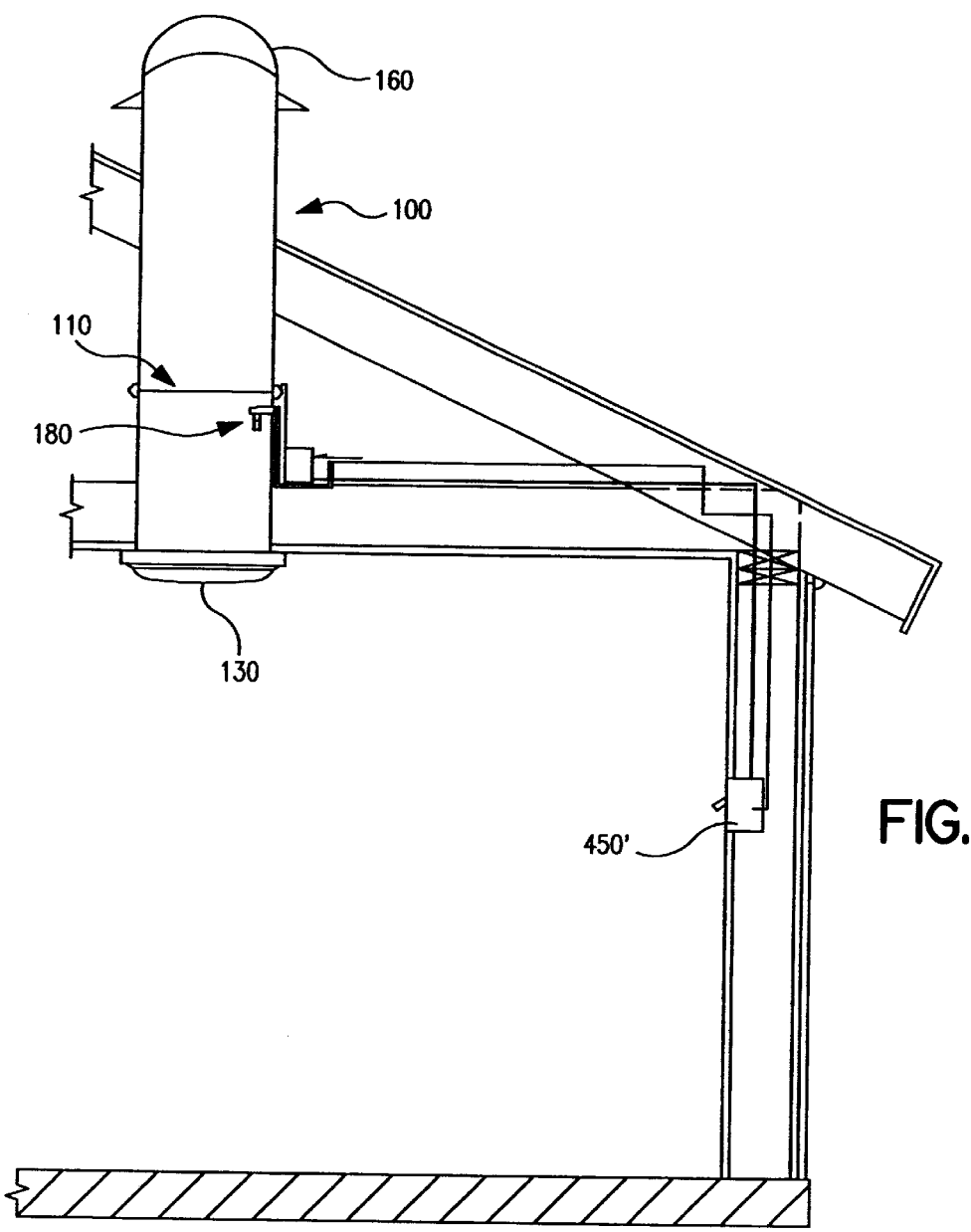
FIG. 7 is a fragmentary, diagrammatic illustration of a skylight installation in a building.
Figure 7A:
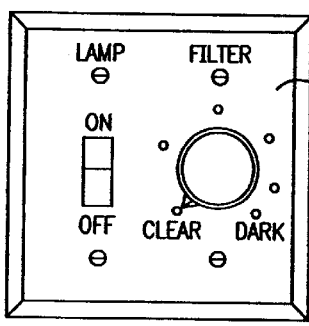
FIGS. 7(a)–7(c) are elevation views of hard-wired user interfaces for use with the installation of FIG. 7.
Figure 7B:
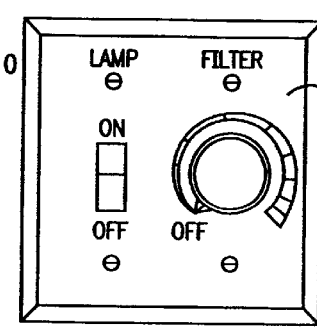
Figure 7C:
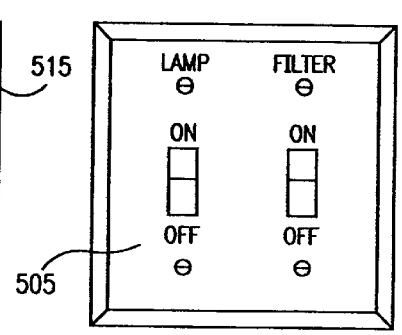
Figure 7D:
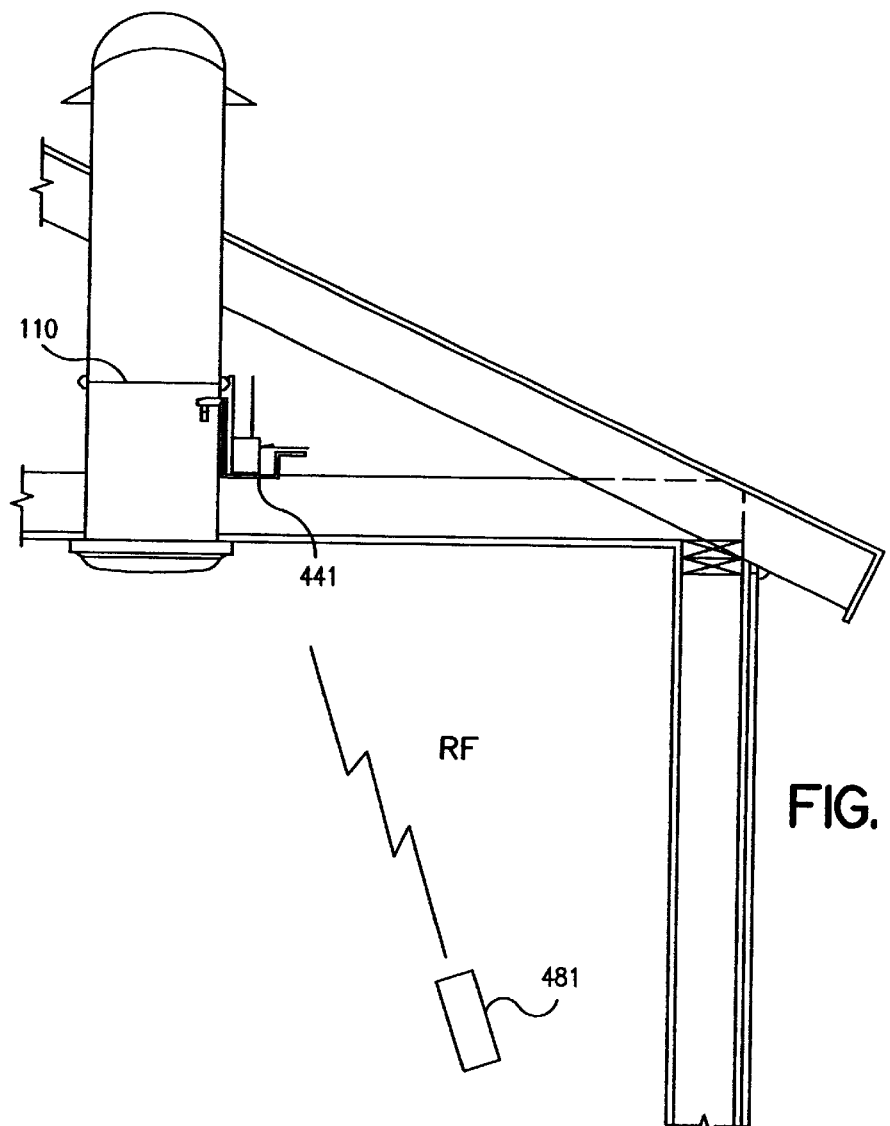
FIG. 7(d) is a fragmentary, diagrammatic illustration of another skylight installation in a building.
Figure 7E:
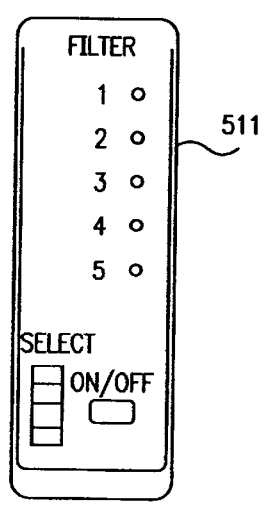
FIGS. 7(e)–7(g) are elevation views of remote radio-frequency interface transmitter units for use with the installation of FIG. 7(d).
Figure 7F:
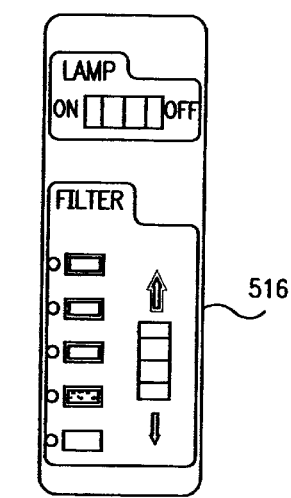
Figure 7G:
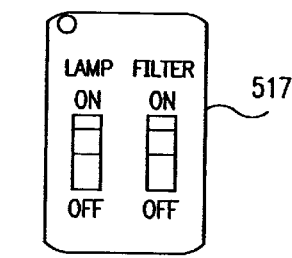

The controller 120 includes the user interface 450 that allows a user to communicate the desired intensity to the filter control circuit 420. This can be done using a hard-wired, wall-mounted interface 450', as indicated in FIG. 7. This can be multi-position switch 510 providing several pre-set levels of transmittance (FIG. 7(a)), with a variable control 515 providing substantially any level of transmittance within a range defined by the circuitry (FIG. 7(b)) or with a switch 505 to turn the filter on or off (FIG. 7(c)) providing just two levels of transmittance. The installation of FIG. 7 envisions the inclusion of a lamp 180 and the wall mounted units of FIGS. 7(a), (b) and (c) include switches for control of the lamp.

In FIGS. 7(d)–7(g) is shown a controller 120 that provides the same functionality as the controller 120 of FIGS. 7 and 7(a)–7(c), but that uses a RF remote. A user control/receiver 441 is shown mounted next to the chromogenic filter 110. A RF remote/transmitter 481 communicates with the control/receiver 441. The remote can be a unit 511 providing several pre-set levels of filter transmittance (FIG. 7(e), a variable control 516 providing any level of transmittance (FIG. 7(f), or a single switch 517 to turn the filter only on or off (FIG. 7(g)).

Preferably, the user control receiver 440 comprises a standard remote control transmitter 480 and receiver 440. When this type of remote control system forms part of the user interface 450, all aspects of the skylight 100 are preferably under the control of one controller 120, including the mechanical shutter control 430 and the lamp control 410 discussed below.

When an infrared-based remote control system is used, an IR sensor 444 (FIG. 8) must be substantially in the line of sight of the transmitter 480. But the user control/receiver 440 includes an IR sensor 444. This may be hidden above the interior light diffuser 130. Infrared transmitters are able to transmit through the interior light diffuser 130. Preferably, the sensor 444 and its accompanying mount are located to avoid casting interior shadows onto the interior light diffuser 130 or into the building interior, as by connection to the periphery of the filter 110. The infrared transmitter may not transmit well through both the interior light diffuser 130 and the chromogenic filter 110, so the sensor 444 is preferably located beneath the chromogenic filter 110. Mounting the sensor 444 higher in the tube 105 necessitates operating the transmitter 480 more directly below the skylight 100. Depending upon the installation, the position of the remote sensor 444 within the tubular portion 105 can be adjusted to achieve a wide or narrow area of operation.

Figure 8:
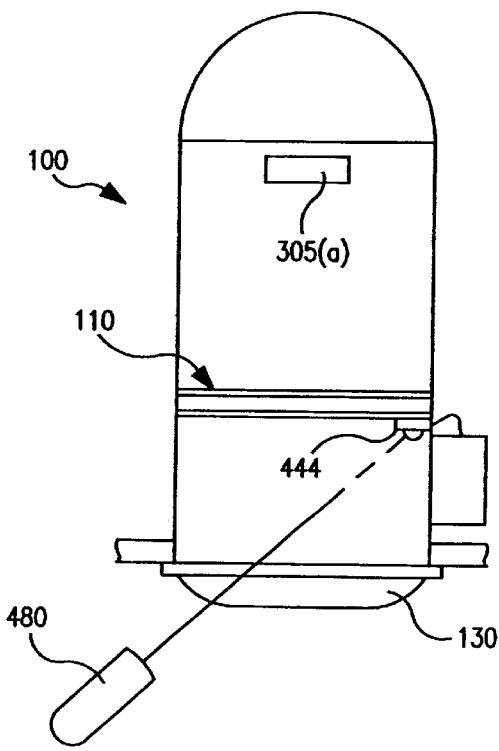
FIG. 8 is a diagrammatic view of a skylight installation with infrared remote and solar cell.
Figure 8A:
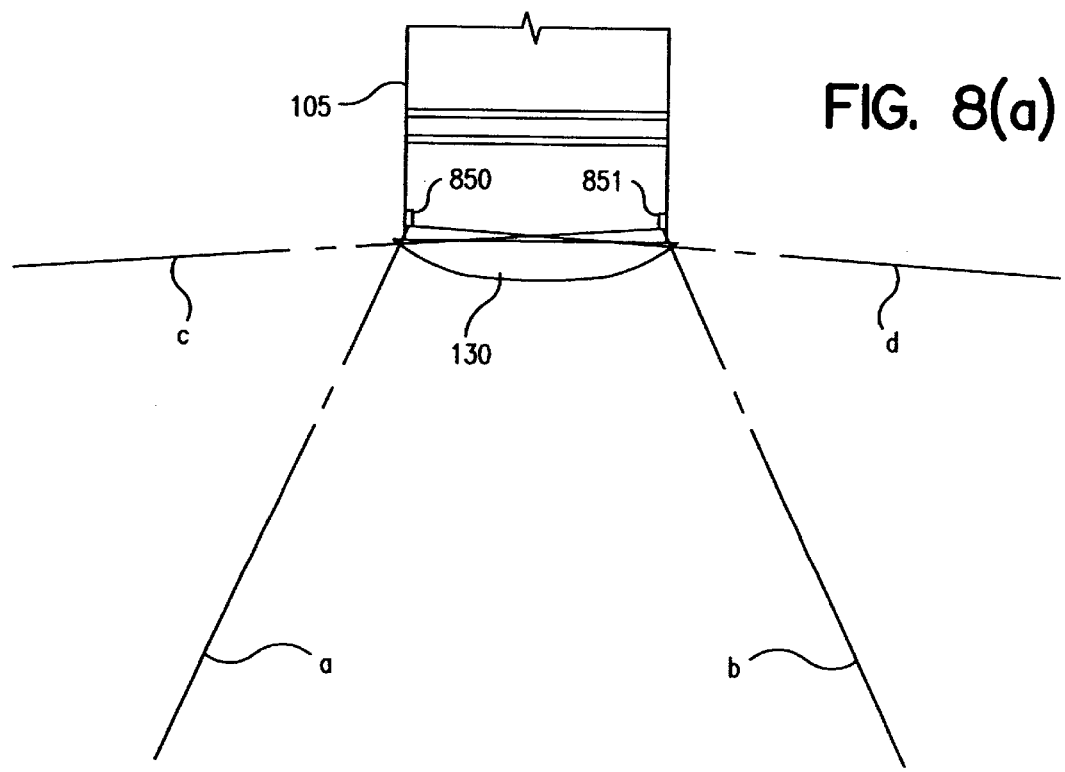
FIG. 8(a) is a fragmentary, diagrammatic illustration of a skylight with two infrared sensors.
Figure 8B:
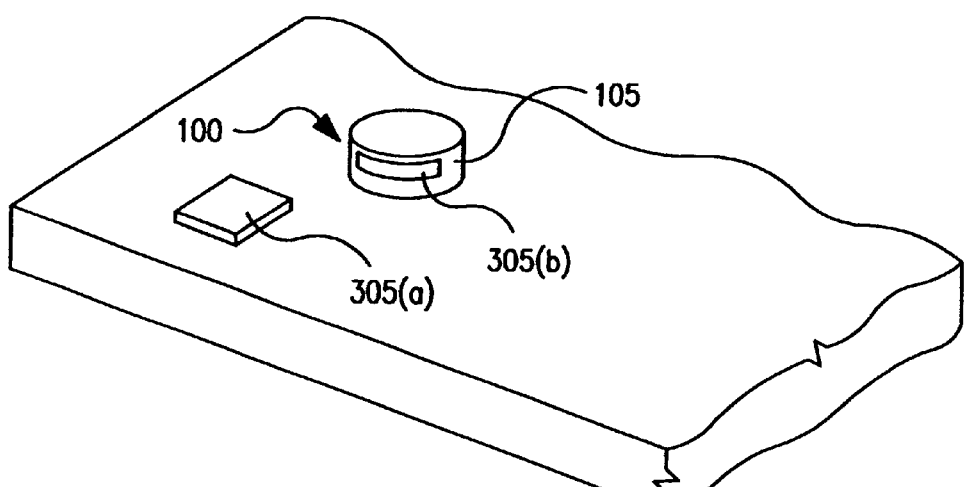
FIG. 8(b) is a fragmentary perspective view of a roof with installed skylight and two types of solar cell installations.
Figure 8C:
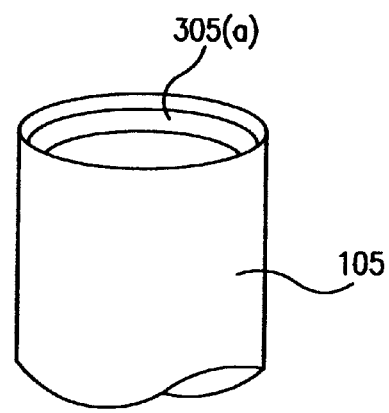
FIG. 8(c) is a fragmentary view of a skylight tube with internal solar cell.

As shown in FIG. 8(a), where a user communication with the skylight control circuitry is by IR remote, and the IR sensor is located in the skylight masked by the diffuser 130, the interior area from which communication can be achieved is increased by deploying two or more sensors in the skylight. At one side, the lower end of the tube wall 105 interferes with the line of sight to a sensor 850. This limits the angle at which a user can communicate with the sensor to a line of sight represented by a line designated a. One the other side of the skylight, a sensor 851 has a line of sight similarly limited as indicated by the line designated b. Use of both sensors for communication to the control circuit, however, greatly expands the interior area from which IR line of sight communications can be had as indicated by the lines designated c and d.

The IR sensor can be mounted apart from the skylight and wired to the controller 120 of FIG. 2(a). In addition, one IR sensor can be employed to serve more than one skylight.

Figure 20:
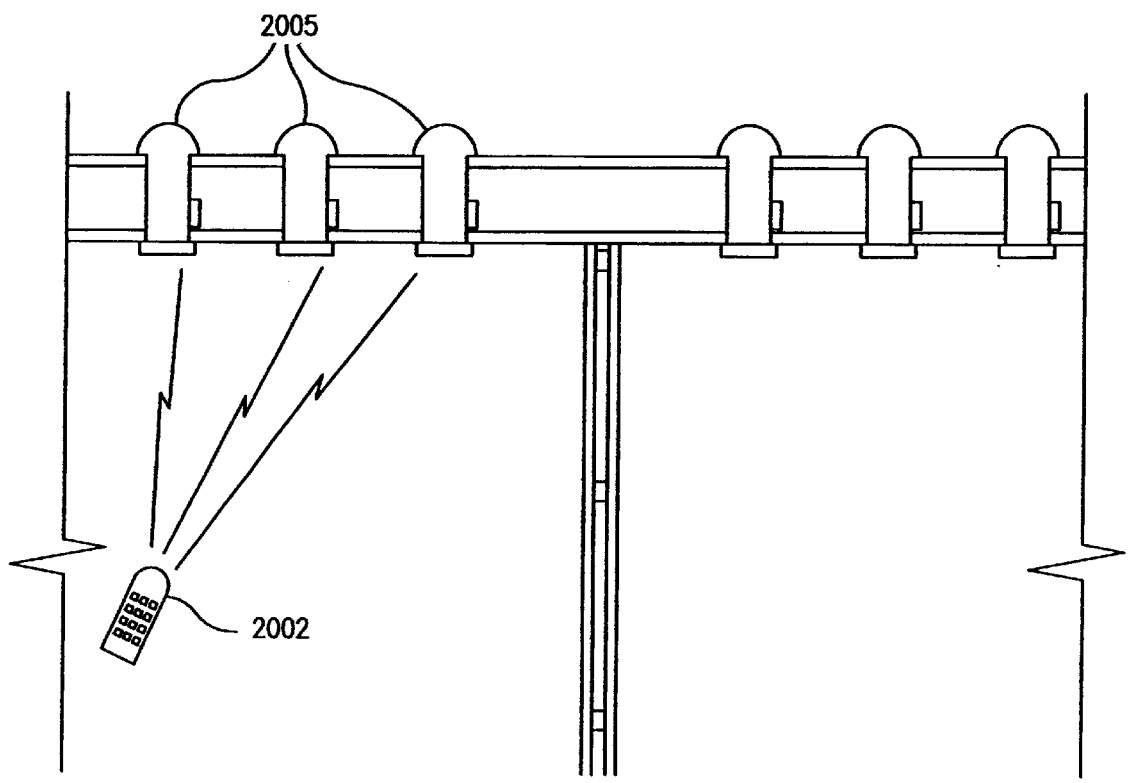
FIG. 20 is a block diagram illustrating a radio frequency remote user interface to control only selected chromogenic filters.

Radio-frequency remote control systems allow for much greater flexibility in sensor 444 placement because the transmitted signal is omnidirectional and can pass through walls and ceilings. The RF signal is coded and the receiver configured to receive this code. This ensures that the other skylight or the appliances are not triggered. A preferred way is to have several codes available which can be either programmed or set by simple change of jumper wires or switches. This allows the same electronics module to be used for different non-interfering skylights installed in the same building. Alternatively, as schematically shown in FIG. 20, one may use only one transmitter 2002 to turn on all or several skylights 2005, which are in close proximity to each other. To keep the RF signal intensity low, it is preferred that the RF modules be designed to work up to 10 meters distance. For special cases, longer range may be required. The RF power should be lower than 5 mW, preferably lower than 2 mW. The RF frequency should preferably be lower than 1 GHz, preferably in the vicinity of 315 MHz. A preferred way of using the remote is to mount this on the walls similar to light switch so that various remotes for different skylight or appliances do not get mixed. However, these should be easy to remove for servicing, such as battery replacement.

The controller 120 (FIG. 2(a) can also include an indicator 452 through which feedback is provided to the user. This feedback allows the user to know that the controller 120 is receiving the user's commands. Additionally, the indicator 452 preferably communicates the transmittance set-point of the chromogenic filter 110. The feedback acknowledging receipt of user commands and the communication of set-point can be accomplished in a number of ways. For example, in one embodiment, the feedback is provided routinely by a LED that flashes upon reception of a command from the remote control transmitter 480. The indicator can include a chime or beeper that sounds upon the reception of a command. The series of LEDs 454 that act as a bar graph communicating the transmittance of the chromogenic filter 110 can alternatively be an alphanumeric display used for this purpose.

Figure 19:
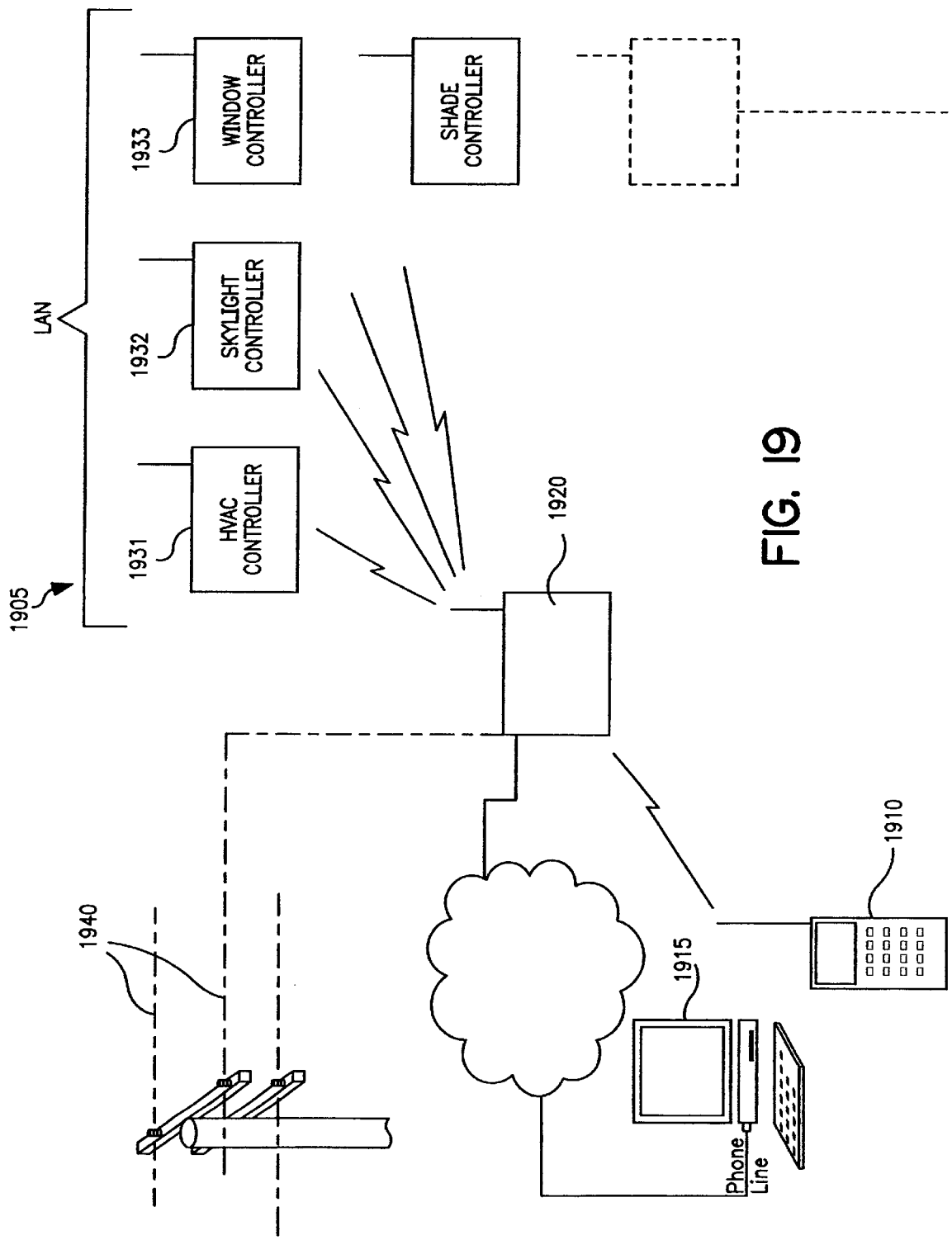
FIG. 19 is a block diagram of a system integrating chromogenic elements into a local area network.

Yet another novel way to control or actuate the chromogenic skylight or windows by a wireless communication system would be through the Bluetooth technology. Here, as schematically illustrated in FIG. 19, a local area network 1905 (LAN) is provided which links via radio signals. The local area network 1905 may be for the entire building or for specific parts. The user interface in such case could be a phone 1910 (e.g., mobile phone), computer 1915 (e.g., mobile computer including a device such as wireless palm products (Palm Inc, Santa Clara, Calif.)), a stand alone portable or fixed interface 1920, which will also be typically used to control other functions and appliances in the building. The user interface sends a signal to the controller 1931, 1932, 1933, etc. or the actuator via this radio link. A receiving node is incorporated in the controller/actuator system. One may extend the utility of such a link to operate mechanical functions of windows and the skylights, such as opening/closing, operation of mechanical shades, etc. with this technology. This can be used for buildings and several modes of transportation such as boats, planes, trains and buses. The user interface could also be a centralized energy management or HVAC controller, which while controlling other functions would also integrate chromogenic window control to optimize the energy usage, user comfort, etc. Yet another novel way to send control signals via the existing electrical wiring network (for electric power in the building). For example EnBW (Wuerttemberg, Germany) has shown that internet data could be sent over the metal wires while they simultaneously carry electricity, and this signal can be tapped from an electrical outlet. This technology also dubbed "digital powerline" may be combined with other modes of data exchange.

A chromogenic filter 810 (FIG. 10) may also be mounted in a way so that it is located below an interior diffuser (i.e., between the interior diffuser and the user as shown in FIGS. 10 and 11.) The edges including the electrical connectors in this embodiment are hidden by appropriately designing the trim 818. FIGS. 10 and 11 show exemplary ways of doing this. The advantage of this configuration is that the chromogenic panel is visible to the end user. In addition, since the chromogenic filter is in contact with room air, it is cooler during the summer use which may extend the filter lifetime. Thus the user is able to appreciate the functionality and value of the electronically dimming filter even more. To further accentuate the chromogenic filter designer trim such as those used in the lighting industry can be used. The interior diffuser can be a planer as in FIG. 10, concave, as at 930 in FIG. 11, or convex (not shown). It can be shaped and patterned in a way so that the light distribution can be optimized as desired for the task or the end-user. Of course, the haze enhancing features described previously can be employed to increase the diffuseness of the light entering an interior through this skylight as well.

Control Circuit

The circuit described here has several features:
1. Takes in 6 to 12 V DC input which is rectified
2. Is capable of applying several coloring and bleach potentials selectable from a number of choices subject to a maximum in current described below.
3. Includes functionality for over voltage for both coloring and the bleach potential
4. The circuit also limits the maximum current to the chromogenic filter. In this case a limit of 0.5 A is demonstrated. Typically the limit is set between 0.2 to 2 A/sq.ft. of the electrochromic device active area. This limit prevents the large spikes of current that the electrochromic devices see during the initiation of coloration and the bleach process. This also prevents the circuit from overheating in case a short develops in the system.
5. This also incorporates a an indirect way to electronically monitor the color of the electrochromic filter and when colored. When the filter colors to a desired point it removes the coloring potential. The coloring potential is applied again when the filter bleaches to a desired level. The extent of bleach which is generally tolerable before the user perceives a change in filter transmission is typically less than 5%, preferably lower than 2% of the transmission which is being maintained. Since the level of coloration depends on the open cell potential of the electrochromic cell, the circuit applies a coloring potential and removes this (open circuit) when the panel is colored. Then it periodically checks the open circuit potential of the filter. When the potential of the filter drops by about 25% of the originally applied potential, then it reapplies the original potential for coloration. Depending on how fast the open circuit potential drops (which could be a strong function of temperature for a given electrochromic panel) one may choose the reapplication potential between 5 and 50% of the original applied potential.
6. This circuit also incorporates a feature, where if no activity (by the user) occurs in the sense of applying coloration or bleach, after a pre-set time, the filter returns to a pre-set condition deemed to be the preferred rest state of the filter. In this example 12 hours is chosen as the time, and the rest state is chosen as the bleach state. Thus a bleach potential is applied after 12 hours.
7. During inactivity, while the filter is in the bleach state, the controller also applies a bleach potential every twenty four hours for 15 minutes. This is not necessary, however, some electrochromic filters may benefit from this to reverse any undesired coloration which may occur over long periods of inactivity.

As seen in FIG. 5, an electronics box 720 that houses the control circuit 120 and/or a battery which may be associated with the chromogenic system is readily accessed through a panel 725 which can be opened from inside the tube 105". This panel is easily reachable for servicing and preferably located near the ceiling 727 within the tube. The panel 725 is closeable and ordinarily, like the interior surface 727 of the tube, it has high reflectivity on the surface which faces inside the tube. This minimizes light loss. The panel may be made of the same material as the light pipe material, or be surfaced with the same material as the light pipe material. The panel is preferably shaped so that it is substantially the same curvature as the tube.

Figure 12A:
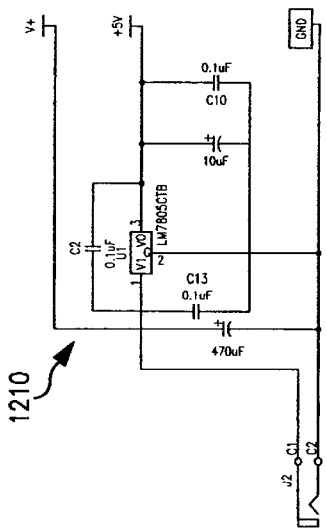

An exemplary control circuit is illustrated in FIGS. 12(a), (b), and (c). In FIG. 12(a), 9 volts DC is delivered to a connector J2 of an input to a 5 volt DC regulator 1210. The 9 volt DC input can be provided by an AC to DC adapter connected to a 115 V AC mains, a suitable solar cell source or a rechargeable or non-rechargeable battery. Connected as illustrated in FIG. 12(a), the 5 V DC regulator employs a LM 7805 CTB regulator IC to deliver stable 5 V DC to the circuitry of FIGS. 12(b) and 12(c).

Figure 12B:
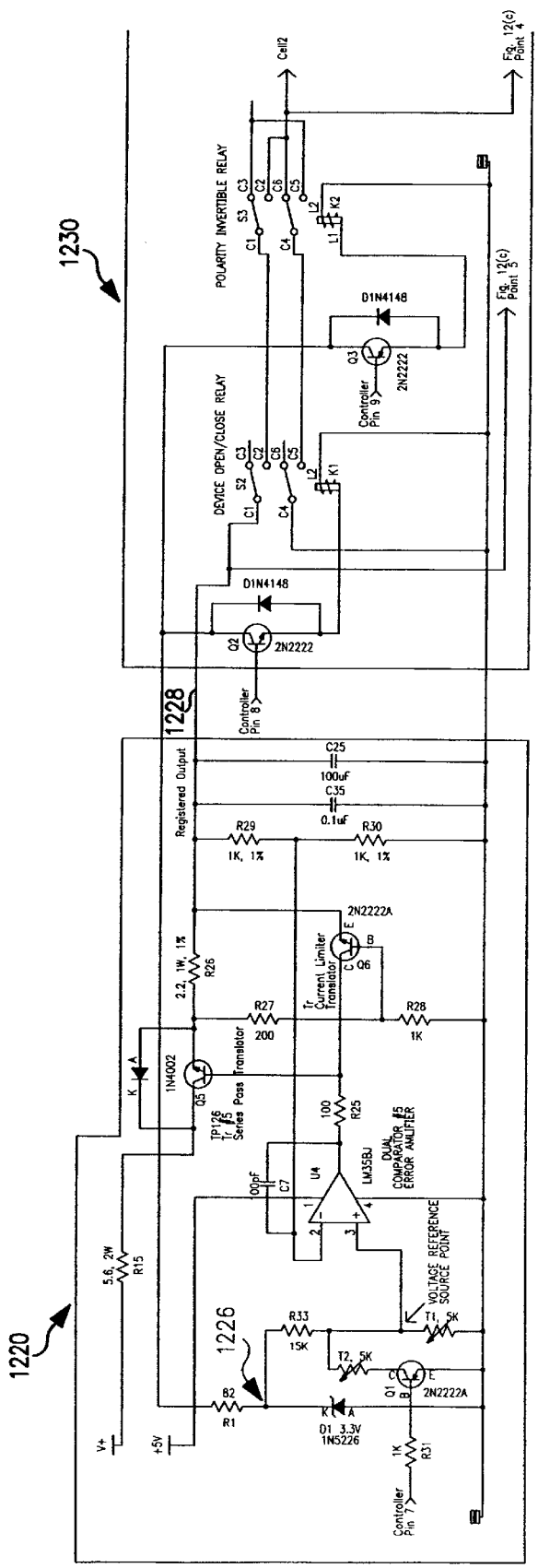

Under control of a PIC16F84-04/P microcontroller 1215, available from MicroChip Corporation, Chandler, Ariz., shown in FIG. 12(c), a regulation circuit 1220 of FIG. 12(b) delivers either a regulated 0.3 V or a regulated 1.2 V for application to the electrodes of the electrochromic filter. An operational amplifier U4 in the regulation circuit 1220 is connected as comparative. It takes one input at pin 2 from a voltage divider formed by a pair of 1 K ohm resistors R29 and R30 connected across the output line, 1228. Its other input at pin 3 is taken from a voltage divider formed by a 5 K ohm trimmer T1 and a 15 K ohm fixed resistor R33. Input voltage at pin 3 of the comparator U4 varies in dependence on the state of a transistor Q1, which has its base connected through a 1K ohm resistor R31 to pin 7 of the microcontroller 1215 of FIG. 12(*c*). The collector emitter circuit of transistor Q1 is connected in series with a further 5 K ohm trimmer T2 between ground and pin 3 of the comparator U4. Reference voltage point 1224 is at the junction of an 82 ohm resistor R1 connected to a 3.3 V reference established by a Zener diode D1. Conduction by the transistor Q1 reduces the voltage at pin 3 of the comparator U4 by placing a trimmer T2 in parallel with the trimmer T1. The regulation circuit 1220 further includes a series pass transistor Q5 connected in series with 5.5 ohm resistor R15 of V+ line as illustrated and a current limitor transistor Q6 in series with the output of the comparator U4. Depending upon whether the transistor Q1 is conducting or not conducting, the regulation circuit 1220 provides at its output line 1228 a regulated 0.3 volts or a regulated 1.2 volts.

An output switching circuit 1230 has a pair of outputs (designated Cell 1 and Cell 2) connected to the electrochromic filter electrodes and is controlled by the microcontroller 1215 of FIG. 12(*c*). The circuit 1230 has a first relay S2 operable to switch between an open circuit condition, as illustrated in FIG. 12(*b*), and a closed position under control of the relay coil K1, to which is connected control transistor Q2. Conduction of the transistor Q2 is controlled by the microcontroller output pin 8, which connected to the base of the transistor Q2.

A second relay S3 of the switching circuit 1230 is operative to invert the application of the output voltage of the regulation circuit 1220 as controlled by its coil K2 and a further control transistor Q3. Conduction of the transistor Q3, and hence operation of the relay S3, is controlled by output pin 9 of the microcontroller, which is connected to the base of the transistor Q3.

As shown in FIG. 12(*c*), four additional operation amplifiers provide input to the microcontroller 1215. A LM324J operational amplifier connected as a comparator U3 compares the voltage at a voltage divider formed by a trimmer T3 and a fixed resistor R84 to the potential at a sensing point 4 applied to the electrochromic filter electrode from the relay S3 in FIG. 12(*b*) to detect when in the discharging cycle during a color process the voltage reaches 0.9 V low coloring threshold of voltage limit as set by the trimmer T3. Output from this comparator 1232 is input to pin 10 of the microcontroller 1215.

A LM324J operational amplifier connected as a comparator U2 compares the voltage at a voltage divider formed by the trimmer T4 and a fixed resistor R83 to the potential at the sensing point 4 to detect when the cell voltage limit reaches a high coloring control voltage of 1.2 volts in the charging cycle during a color process as set by the trimmer T4. Output from the comparator U2 is input to pin 11 of the microcontroller 1215.

A LM324J operational amplifier connected as a comparator U5 compares the voltage at a voltage divider formed by two fixed resistance resistors R70 and R66 to the voltage et al. sensing point 5 at the regulated voltage input to the relay S2 in FIG. 12(*b*) to detect bleaching potential over-voltage above 0.6 volts before the filter is connected during the bleaching process. Output from the comparator U5 is input to pin 12 of the microcontroller 1215.

A LM324J operational amplifier connected as a comparator U6 compares the voltage at a voltage divider formed by two fixed resistors R62 and R61 with the voltage from the sensing point 5 to detect when the coloring potential overvoltage is above 1.4 volts before the filter is connected during the coloring process. Output from the comparator 1238 is input to pin 13 of the microcontroller 1215.

An external switch 1240 is connected between ground and pin 6 of the microcontroller 1215. The programming of the microcontroller 1215 is such that when the switch 1240 is closed, the "ON" position, the comparator U4 controls output of 1.2 volts to the electrochromic filter via the relays S2 and S3 to place the filter in its color phase. When open, or "OFF", the switch 1240, microcontroller 1215 and transistor Q1 cause the comparator U4 to control output of 0.3 volts to the electrochromic filter via relays S2 and S3 to place the filter in its bleached state. Closure of the external switch 1240 also results in a logical 1 output at pin 9 of the microcontroller being applied to the base of the transistor Q3. This activates relay S3 inverting the input to the filter.

A closing of the external switch 1240 results in an output at pin 8 connected to the base of resistor Q2 resulting in closure of the relay S2. Opening of the switch 1240, on the other hand, results in a logical 0 applied to the base of transistor Q2 with a resulting opening of the relay S2. Opening of the switch 1240 applies a logical 0 to the base of transistor Q3 with the result that the relay S3 is as shown in FIG. 12(*b*), e.g. noninverted. This then controls the bleach process when the external switch 1240 is turned "OFF" and controls the bleach process when a 12 hour timeout occurs.

Alternative Control Circuit

Figure 17A:
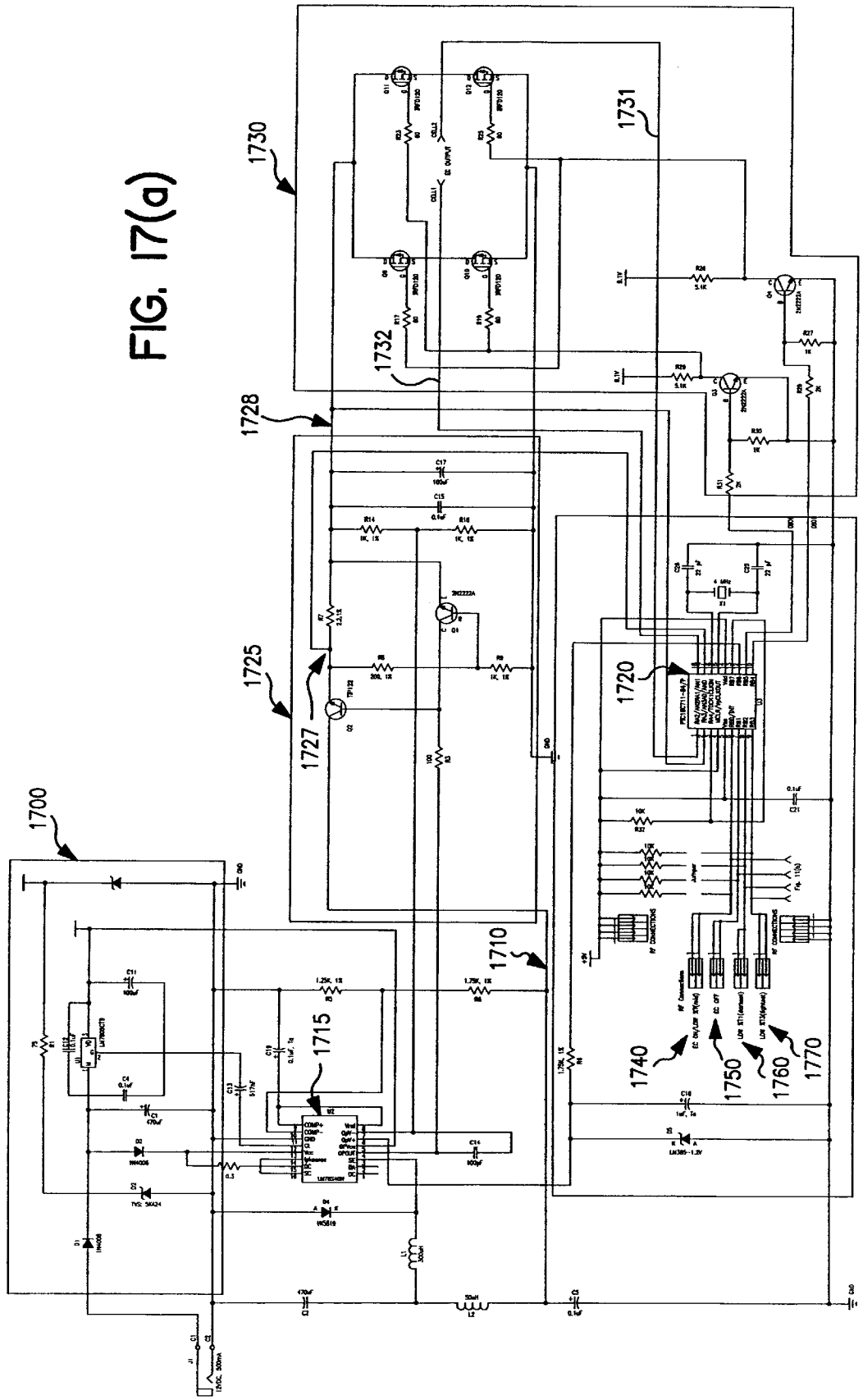
FIGS. 17(a) and 17(b) are schematic circuit diagrams for a RF controlled electrochromic filter control circuit.
Figure 17B:
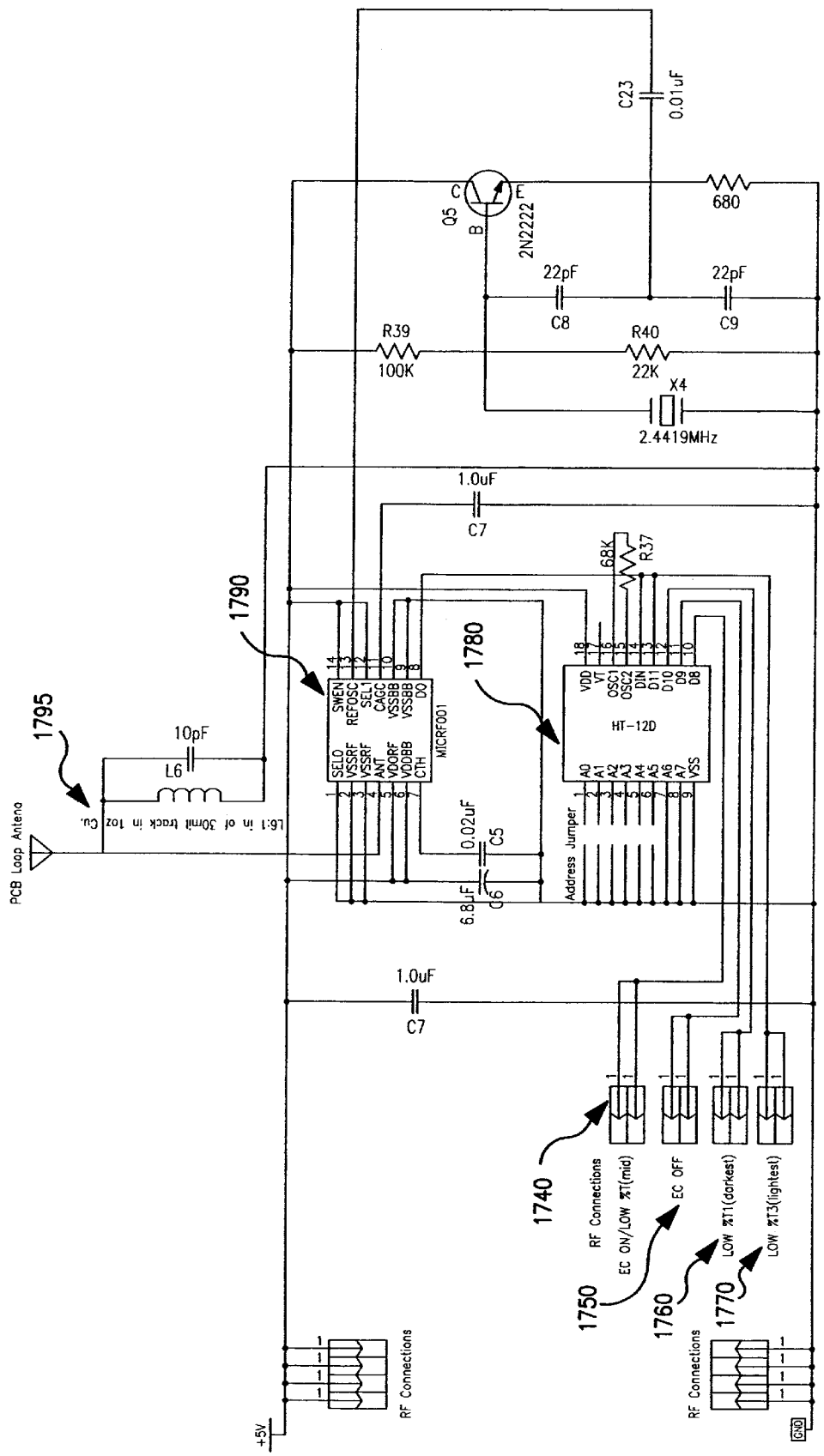

A further exemplary control circuit is illustrated in FIGS. 17(*a*) and 17(*b*). This control circuit has several features as compared to the circuit previously described.

1. This circuit consumes lower power because mechanical relays are substituted with lower power consuming solid state switches and instead of using linear voltage regulation it uses a switching power supply to step down in voltage while maintaining high power conversion efficiency.
2. The solid state switches (H bridge) offer more reliability and quieter operation as compared to the mechanical relays.
3. Use of N-MOSFET rather than PNP and NPN bipolar transistors enhances the ruggedness and stability, particularly at increasing temperatures. Further N-MOSFETs are surface mountable thus reducing cost in assembly.
4. The PIC16C711-04/P offers complete programmability of voltages to be applied to the EC device rather than a few select voltages.
5. This circuit can be configured with a manual switch as the other circuit or optionally configured to be activated by a remote. An RF remote system is described with up to 4 feedbacks.
6. Due to the elimination of mechanical relays and surface mounting of all components, this design can be implemented in smaller size and lower cost.

In FIG. 17(*a*), 12 volts DC is delivered to a connector J1 of an input DC regulator 1700 and 1715. The 12 volts DC input can be provided by an AC to DC adapter to a 115 V AC mains, a suitable solar cell source or a rechargeable or non-rechargeable battery. Connected as illustrated in circuit 1700, the 5 V DC regulator employs a LM7805CTB regulator IC to deliver stable 5 V DC to the circuitry of FIGS. 17(*a*) and 17(*b*). Circuit 1715 employs a high efficiency switching regulator, LM78S40N, available from National Semiconductor, Santa Clara, Calif., to step 12 volts DC input down to 3 volts DC regulated output, where the 3 volts DC is used to drive circuit 1725 as shown in FIG. 17(*a*).

In FIG. 17(*b*) RF circuitry is preferably operated at an unlicensed frequency which at present is between 260 MHz and 470 MHz, and in this example 315 MHz was selected. This is shown as a remote controlled receiver of the circuit 1720 in FIG. 17(*a*). The switching commands are sent remotely by a corresponding RF transmitter and executed via circuit 1720 through software on a microcontroller PIC16C711-04/P, available from MicroChip Corporation, Chandler, Ariz., Under control of the microcontroller 1720 shown in FIG. 17(*a*), a programmable linear voltage regulator of the circuit 1725 is designed to deliver a continuous positive voltage up to 1.5 volts to an output line 1728. An independent operational amplifier, featured inside of the switching regulator LM78S40N in the circuit 1715, is connected as comparative. It takes one input to pin 7 of circuit 1715 from a voltage divider formed by a pair of 1 K ohm resistors R14 and R18 connected across the output line, 1728. Its other input, pin 6 of circuit 1715, is connected to R4 and C18 of an RC circuit acting as a D/A converter, forming a reference voltage from a pulse width modulated (PWM) signal, which is controlled by pin 12 of circuit 1720. The linear voltage regulation in circuit 1725 includes a series pass transistor Q2 connected in series with 3 volts DC at line 1710. As illustrated, the circuit 1725 further includes a current limiting transistor Q1 in series with the output of the comparator, pin 4 of circuit 1715. Depending upon a duty cycle of PWM signal, a ratio of on vs. off state of the pulse width modulated signal, the corresponding voltage at output line 1728 can be programmed according to the converted reference voltage generated from PWM in the circuit 1720.

Traditionally, bipolar PNP and NPN power transistors have been used in most linear regulators designed around series-pass regulator. As illustrated in circuit 1725 of FIG. 17(*a*), a series pass Darlington bipolar NPN transistor, TIP 122 in Q2, available from Motorola Inc., Phoenix, Ariz. is used in this application. Alternatively, the series pass regulator can be also configured from power N-channel MOSFET(N-MOSFET), where such design can further improve overall electrical ruggedness and stability. In circuit 1725, the NPN series pass transistor, TIP122 in Q2, can be replaced with N-channel, logic-level MOSFET IRL530N, available from International Rectifier, El Segundo, Calif., where the gate of the MOSFET is connected to pin 4 of the output comparator in circuit 1715, the drain of the MOSFET is connected in series with the output line 1710, and the source of the MOSFET is connected to the output of the series pass regulator at line 1727. With further modification of gate voltage with respect to the output voltage of the series pass MOSFET transistor, a wide family of power N-MOSFET, such as IRF620, IRFZ44 and IRF3205 etc., available from International Rectifier, can be used for the application.

An output switching circuit 1730 has a pair of outputs (designated Cell 1 and Cell 2) connected to the electrochromic filter electrodes and is controlled by the microcontroller 1720 in FIG. (17(*a*). The circuit 1330 is configured with four N-channel MOSFETs (N-MOSFET), IRFD120, Q9–Q12, available from International Rectifier, El Segundo, Calif. The four N-MOSFETs form an H shaped electronic bridge (H-bridge) with the electrochromic filter electrodes connected in the middle H-bridge circuit as shown in output line 1732 and 1734. N-MOSFETs Q9 and Q12 are driven by transistor Q4, where the base of Q4 is connected to pin 10 of circuit 1720. N-MOSFETs Q11 and Q10 are driven by transistor Q3, where the base of Q3 is connected to pin 11 of circuit 1720. When the entire circuit is powered up initially, logic 1 is applied to the bases of both Q3 and Q4 transistors, where the electrochromic filter is operated under an open circuit phase and no voltage is applied to the output of circuit 1730. When a logic 0 is applied to the base of transistor Q4 in circuit 1730, a positive output voltage, e.g. 1.2 volts, is applied to the electrochromic filter electrodes by turning on both N-MOSFETs Q9 and Q12 and placing the filter in its color phase. When a logic 0 is applied to the base of transistor Q3 in circuit 1730, a negative output voltage, e.g. −0.3 volt, is applied to the electrochromic filter electrodes by turning on both N-MOSFETs Q11 and Q10 and placing the filter in its bleached phase. A logic 0 applied to both transistors Q3 and Q4 at the same time is prohibited by the design in circuit 1720 via software.

As shown in FIG. 17(*a*), four additional 8 bit analog to digital converters (A/D converter) were featured inside of PIC16C711-04/P microcontroller in circuit 1720, where the A/D converters were used to provide additional feedback information about voltage, current and charge condition of the electrochromic filter. One A/D converter is connected to the emitter of Q2 transistor at line 1727 from pin 17 of the circuit 1720. Another A/D converter is connected to the output line 1728, where the output voltage of the circuit 1725 is measured by pin 2 of the circuit 1720. The difference in voltage between the points of 1727 and 1728 is used to determine the current consumption of the linear voltage regulator and the status of current to the electrochromic filter electrodes. Moreover, the electrical charge over time to the electrochromic filter can be determined from the current information provided above. The remaining two A/D converters are placed at the output to the electrochromic filter electrodes via line 1731 to pin 1 and line 1732 to pin 18 of the microcontroller 1720. In this manner, voltage difference between the points of 1732 and 1724 are used to determine the output voltage under the load of the electrochromic filter. If the load voltage exceeds a desired value within a specific amount, the microcontroller is programmed to compensate the difference of the applied voltage by adjusting the reference voltage via the correction of duty cycles of PWM from pin 12 in circuit 1720.

The description below describes the interface between the RF transmitter and the power supply. The microchip has four switches dedicated for RF receiving, thus up to eight combinations or eight commands are possible, however in this example only four combinations are used. The remote is configured to send 4 signals, off, on, darker and lighter. These are only exemplary configuration, however more or less configurations and/or different configurations can also be used. The transmitter should preferably be a four button transmitter for each of these commands. However, other button configurations can also be used such as a two button configuration, where the sequence of button pressing can be related to the four functions described above.

Four remote controlled logical switches, 1740, 1750, 1760 and 1770, are connected to pin 6, pin 7, pin 8 and pin 9 in circuit 1720 respectively as shown in FIG. 17(*a*). Each port is assigned to a specific task written in software in which the microcontroller is able to sense the changes of the ports and control the performance of the electrochromic filter according to user's need. The electrical connections are further connected from pin 10, pin 1, pin 12 and pin 13 of the circuit 1780 in FIG. 17(*b*), where they are interfaced with 315 MHz RF receiver, MICRF001 of circuit 1790, available from Micrel Semiconductor, San Jose, Calif. A four button matched 315 MHz RF transmitter is used, where each button on the transmitter corresponds directly with the assigned port in circuit 1720. With one of button on the RF transmitter is pressed, coded 315 MHz RF signal is transmitted through air and received by antenna 1795 of circuit 1790 as illustrated in FIG. 17(*b*). The received RF signal is demodulated by the circuit 1790 and further decoded by the circuit 1780, where the corresponding logical port is notified and the action is taken by the microcontroller in circuit 1720.

When logical 1 is applied to pin 6 of the circuit 1720 in FIG. 17(*a*), the microcontroller of circuit 1720 is turned "ON" and 1.0 volt is applied to place the electrochromic filter in its color mode state. When logical 1 is applied to pin 8 of the circuit 1720, 1.2 volts are applied to place the electrochromic filter in its darker color mode. When logical 1 is applied to pin 9 of circuit 1720, then 0.8 volt is applied to the electrochromic filter and places it in a lighter color mode. If a logical 1 is applied to pin 7 of the circuit 1720, a negative 0.3 volt is applied to the electrochromic filter and place it in its bleach process, and the circuit 1720 will turn itself "OFF" after the electrochromic filter returns to its clear mode. In addition, the microcontroller of circuit 1720 in FIG. 17(*a*) can turn itself "OFF" after a 12-hour timeout in the color mode.

Mechanical Shutter

The mechanical shutter 200 can provide complete control or only coarse control of light transmission through a skylight. When closed, the shutter blocks the transmission of substantially all light through the skylight 100. At night, it reduces radiant heat loss from a building interior. It is particularly useful to have the option of darkening a room during the day. The mechanical shutter 200 includes a pivotal flap 201, FIG. 5. The flap 201 can conform to the interior configuration of the tube 105, or preferably it can be larger in one dimension than the tube width or diameter as shown. For example, a tube 105 that is circular in cross section is fitted with an elliptical flap 201 that, when closed, closely fits the interior surfaces of the tube. The flap 201 pivotally mounted at 204 to be opened or closed. In essence, a mechanical shutter interposes an opaque object in the light path through the skylight to completely or partially block incoming light. In addition to the pivotal flap described, many ways of achieving this blockage may be employed, including an iris, a series of pivotal slats serving as a blind, etc. The surfaces of the flap 201 are preferably treated in the same fashion as the interior surfaces of the tube, for either high specular or diffuse reflectance, however, a specularly reflecting surface is preferred. In one embodiment, at least one surface, but preferably both surfaces, have a specular or diffuse reflectance of greater than substantially 60% and preferably greater than substantially 80%. When the reflection of the surfaces 202, 203 is diffuse, it is preferred that the color of surfaces 202, 203 be neutral or white.

Typical specular reflective materials are highly polished metal such as silver, aluminum, etc. Suitable reflective surfaces include HEM (High Efficiency Mirrors) by 3M (Minneapolis, Minn.) or Everbrite aluminum such as Everbrite 95 by ALCOA (Pittsburgh, Pa.). These materials can be bonded to other materials to provide high reflectivity with increased mechanical stiffness for the mechanical shutter 200. The shutter 200 may be specularly reflective on one surface and diffusely reflective on the other.

High diffuse reflectance can be obtained using a number of methods as known in the art. Examples include coating with acrylic, urethane or epoxy paints that contain titania particles. Latex and oil based paints fitting the above description are widely available. Diffusive coatings on these components increase the overall diffuseness of the light as it passes through the skylight 100. Using paints and coatings that contain UV absorbers further reduces the transmitted UV light.

An advantage of using a highly reflective mechanical shutter 200 is that doing so does not decrease transmitted light when the mechanical shutter 200 is in the open position because these reflective surface or surfaces do not absorb light. In a tubular skylight or any other skylight, a specularly reflective surface of the mechanical shutter is preferred as long as such a surface is not directly visible to the user. For surfaces visible to the users, it is preferred that they have diffused reflectance. Another advantage is that when the mechanical shutter 200 is in the closed position, it can cooperate with the lamp 180 to increase the amount of light that the lamp 180 delivers into the room, serving as a reflector.

The mechanical shutter 200 can be operated either manually or automatically through a shutter actuator 201. When operated automatically, its shutter actuator 201 can be controlled by the same control that controls the chromogenic filter 110 or by a separate unit. As discussed above, a single integrated controller 120 containing a filter control 420 and a mechanical shutter control 430 to control both the chromogenic filter 110 and mechanical shutter 200 (through the shutter actuator 201) is preferred. The shutter actuator 201 can be an electric motor such as a stepper motor. A novel way to actuate the shutter is through a linear actuator using a shape memory alloy, or a polymeric elastomer coated with conductive material. An exemplary actuator of this kind is shown schematically in FIGS. 13(*a*) and 13(*b*). The term "muscle wire" is used herein to refer to each of these elements whose dimensional characteristics change when electric power is applied. Both the alloy and elastomer shorten when a potential is applied. For example, Nitinol, a shape memory alloy, is available in a number of different configurations from Shape Memory Applications, Inc. (Santa Clara, Calif.) or Mondotronics (San Rafael, Calif.).

FIGS. 13(*a*) and 13(*b*) illustrate how a rack and pinion gear set 1310 works with a muscle wire coil 1325 to activate a shutter flap 1320. The spring constant of a retractive spring 1322 should be less than the spring constant of the muscle wire coil 1325 when activated. In addition to the spring, dampers may be used to reduce or eliminate resonance (ringing). The electronic control circuit applies a voltage across the muscle wire 1325 at the electrical connectors 1327 and 1328 which causes the muscle wire to retract. This produces linear movement in the rack 1312 turning the pinion 1314. The pinion is attached to a support shaft 1329 for the shutter flap 1320 and thus pivots the shaft and attached flap. For a retro-fit skylight with this feature, one may provide the power to the control circuit by a solar panel. Also, one may use a hard wired switch for a user to activate the flap, or it may be a wireless remote switch. One may also tie the control system with a central control system of the building so that the energy consumption, lighting levels and the user comfort can be automatically optimized with changes in ambient conditions.

In FIGS. 14, 15 and 16, other shutter mechanism activated by muscle wires or metal coated polymer are used for window shades and skylights for buildings, boats, busses, trains, etc. These are particularly suitable for applications where it is desired to control light rather than to optimize vision through the window. As an example, these mechanisms or electrochromic panels can be sandwiched between the two translucent substrates. For example, Keller Company (Manchester, N.H.) and Vista Wall (Terrel, Tex.) make skylight and wall panels called Kalwall™ and Skywall™ respectively made from translucent panels which are spaced apart parallel to one another and may have insulating material in between. The devices of the invention can be enclosed between the space formed by the inner and the outer wall. The insulating material could be optionally inserted on one or both sides of this device. Preferred insulating materials are those which will still keep light transmission property, an example being colorless glass fibers.

In FIG. 14, two clear substrates 1410 and 1415 (or two sets of at least two rails each) are movable relative to each other. As shown in the figure, there are alternate stripes 1420 and 1425 on each substrate which are transparent and light blocking, respectively. In the exemplary embodiment of FIG. 14, the lower substrate is moved so that the transparent and blocking stripes on it are moved into and out of alignment with those on the upper substrate to pass and block incident light. Clearly, the upper substrate could be the movable substrate if desired or each could move to accomplish the same result. Reflective stripes are preferred for the blocking stripes 1425 as they will save more energy by reflecting heat and light rather than absorbing them. The preferred reflectivity values for this design or others are the same as given for mechanical shutter flaps above. The shade can be closed or opened by the use of the muscle wire. Although only one muscle wire coil spring 1440 and one retractive spring 1445 are shown in FIG. 14 and subsequent figures, several of these can be connected in parallel to uniformly move large panels. Also, instead of coils, straight muscle wires and strips can also be used as the muscle wire elements. Again, the muscle wire element works against a retractive spring 1445. Appropriate mechanical levers can magnify the movement in the muscle wires, if needed. Typical thickness of the clear substrates 1410 and 1415 will preferably vary from about 0.02 cm to 0.7 cm. Plastic or glass substrates may be used, but plastic substrates are preferred due to their lower weight. Typical preferred plastic substrates are acrylic, polyester, polycarbonate, styrene-acrylonitrile copolymer, polystyrene, polyolefins, etc., glass fiber reinforced thermosets and thermoplastics. In the examples which follow, the clear substrates will also have similar characteristics. The width of the stripes preferably vary from about 0.1 mm to about 2 cm.

In FIG. 15, vertical fins 1520 are attached to clear horizontal substrates 1510 and 1515 or to rails. In these vertical dispositions as shown, these pass light into an interior. These fins may be hinged or otherwise pivotally attached where they are connected to the horizontal members 1510 and 1515. When one of the substrates 1510 and 1515 is moved under the influence of a muscle wire element acting against a retractive spring 1545, then these fins move toward a horizontal disposition and close upon themselves to block light. These sheets made out of plastics may be continuously extruded as "composite sheets." They then can be simply cut to order and installed. These will be low in cost as well as light-weight. The points where the fins meet the substrate can be formed as living hinges for easy deformation. The fins may be non-rigid, meaning elastomeric or having a modulus of elasticity (or rigidity) lower than the substrate. The optical properties of the fin material is preferably chosen so that it provides the right opacity and surface properties. Another approach is to coat the fins with an opacifier or reflective material after extrusion. After extrusion, the composite sheet may be subjected to a chemical treatment, such as dipping the entire structure in a liquid chemical or simply forcing the liquid between the open channels so that the fins are coated with a reflective or other type of material. The surface or bulk properties of the fin may be chosen such that they will selectively absorb the material from the liquid and get coated, whereas in other areas, there will be no optical change. Later, post treatment such as drying, heating or radiation (e.g., UV, microwave, etc.) may be used as needed to make the coating more permanent. The width, rigidity and deformability of the fins are important so that the light transmission is maximized in the open state, the fins do not collapse and fold, and least deformation forces are experienced within the fins and the hinges in the shut state. Materials should be chosen such that these characteristics hold good under all temperature conditions in which the product is used. The width of the fins are typically less than 3 mm thick. The spacing between them will preferably be less than 1 cm. The distance between the substrates will depend on the rigidity of the fins and their deformability, but preferably this is also less than 1 cm.

In the embodiment of FIG. 16, metallic or plastic fins 1620 and 1630 are mounted on two sets of rails 1610 and 1615 or substrates. Preferably, these fins are reflective. The angle and the design of the fins is such that most of the incoming light is directed to the indoors when this shutter is in the open position. The angle of the fins, i.e. $\alpha$ and $\beta$, need not be the same. These angles may vary from about 90±60 degrees. The height of these may vary preferably from about 5 cm down to about 0.5 cm, and more preferably from about 1.5 cm down to 5 mm. Again, working against a retractive spring 1645 connected to the rail pair 1615, a muscle wire coil 1640 or other muscle wire element moves the rail pair 1615 and with it the series of fins 1630. Generally horizontal, light blocking base portions 1650 and 1652 of the fins 1620 and 1630 overlap. In the positions shown, the fins permit light to enter an interior. When the fins 1620 and 1630 are moved apart as seen in FIG. 16(b), light transmission is blocked. In this and all the other systems described above, when the repeat pattern size becomes smaller, the light distribution is perceived more uniform, and when the feature size is coarse or large, then the stripes effect becomes more pronounced. The smallest features in size will be limited by manufacturing costs. One may use louvers to angle (rotate) these appropriately (not shown) with the changing direction of the Sun. This rotation can also be done by a separate set of muscle wires.

Lamp

The lamp 180 represented schematically in FIG. 2(a) provides light at night or otherwise in the absence of sufficient ambient light. The lamp 180 is an optional feature of the skylight 100. It is mounted above the interior light diffuser 130. The lamp 180 can be powered in any convenient way, as by the building mains at 110 volts, by the solar cells 305, or by battery or fuel cell. In the preferred embodiment illustrated, the lamp 180 is turned on or off and, optionally, dimmed by the lamp control 410. Since the lamp 180 is the least durable component of the skylight 100, it is preferably located within the skylight so that it can be replaced from the interior of the building. The lamp 180 can employ any electric lighting technology as is known in the art such as incandescent, fluorescent, halogen, etc. As discussed above, the lamp control 410 can be integral to the controller 120 and can employ any method as known in the art to control the lamp 180. Preferably, the lamp is located so as to avoid casting a shadow onto the diffuser 130 or into the room served by the skylight. Also, when using a lamp, it is preferred to protect the chromogenic filter from the UV light emitted from it. This is particularly true for halogen and mercury lamps. One such protection may require a coating or an extra clear filter between the lamp and the chromogenic filter to block the UV. An example of such a filter is Acrylite OP-3 from Cyro Industries.

Outer Dome/Secondary Diffuser

The uppermost portion of the skylight 100 is the outer dome 160. It collects ambient light and protects the interior of the skylight 100 from the elements. It is known in the art to use a translucent outer dome like the dome 160 to increase the diffuseness of the light transmitted through a skylight. In a preferred embodiment of this invention, the outer dome 160 is clear to maximize light gathering, while diffuseness is provided by means such as interior and secondary light diffusers 130 and 135 respectively, and by a diffusive chromogenic filter 110. Shown mounted just below the dome 160 in FIG. 2(*b*), the secondary light diffuser 135 can be located anywhere along the tubular portion 105 of the skylight 100. Preferably, the dome 160 contains UV absorbers to decrease the amount of UV light allowed into the skylight and building interior. The exclusion of UV is best accomplished near the top of the skylight 100. UV absorbers that have minimal impact on the transmittance of the outer dome 160 to visible light are preferably employed. A preferred material for the dome is Acrylite OP3 which is described before. Useful Preferred UV blockers in the outer dome include benzophenones and benzotriazoles. The outer dome may also provide thermochromic and/or photochromic property.

Solar Cells

Figure 21:
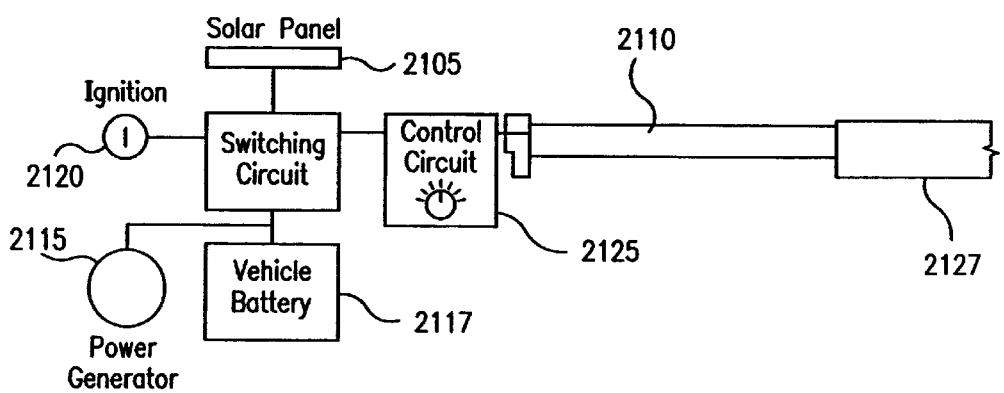
FIG. 21 is a block diagram of a system using a chromogenic panel to control light transmission into a conveyance.

The embodiments illustrated in FIGS. 8, 8(*b*) and 8(*c*) use one or more solar cells 305(*a*), 305(*b*), 305(*c*) to provide power to the skylight 100. Methods for implementing solar electricity production for devices are well known in the art. Various locations for mounting the cells are useful. Solar cell 305(*a*) is mounted on the interior of the skylight 100 of FIG. 8, solar cell 305(*b*) is mounted on the outside portion 105 of the skylight 100 in FIG. 8(*b*), and solar cell 305(*c*) is mounted directly to the roof 307 of the structure separated from the skylight. It is preferred to place the solar cells either inside or outside of the skylight but on the skylight itself for ease in installation. The solar cells may be connected directly to the chromogenic panel, preferably through a switch (to enable the user to exercise control over the dimming of the filter); The solar cell may be connected to a battery, preferably a rechargeable battery which is then connected to the chromogenic panel via a user operated switch; or one may employ power conditioning circuitry before and/or after the battery to match impedances, voltages, etc. For a retrofit it is best that the controller, solar cell and the chromogenic filter be integrated with the skylight and that the skylight be operated by a user via a remote which is wall mounted or portable. If this is a radio frequency remote then the RF receiver could be a part of the control box, if it is IR then the sensor should also be integrated with the skylight. The solar cells can be based on crystalline silicon, amorphous silicon, thin-films, or on non-silicon containing semiconductors. Both rigid and flexible solar cells can be obtained from a variety of sources. In FIG. 8(*a*), a further improvement of the cell mounted on the inner surface of tube 105 is shown. In this situation due to reflection in the tube, the solar cell would experience solar glare most of the time during the day almost independent of its location, as long as its direct light is harvested by the outer dome. Another preferred way of using the solar cell is similar to the concept used for mushroom shaped low voltage lighting powered by the solar cells. Here the solar cells are located on the top surface of the canopy which is about 2 to 6 inches in diameter. Here such a shaped fixture may be used where the electronics and the rechargeable batteries if used are placed below the canopy and protected by this. The stem emanating from the canopy can be used for mounting this canopy on to the skylight structure in a way so that no light is blocked or away from the skylight independent of it. The wires from the electronics to power the chromogenic panel could be fed through the water weep holes in the skylight frame. The wires should be clad in a material which will protect them both from water and the solar radiation. Referring to FIG. 21, solar cells 2105 can also be used to power chromogenic panels 2110 in a vehicle such as an automobile, bus, recreational vehicle (RV), plane, train, boat, etc. ("conveyance"). These panels can be used as sunroof, skylight and windows (side, rear or front glazing). These panels can derive the power from the main vehicle battery 2112 or the power system 2115 when the ignition 2120 is on and from the solar cell 2105 when the ignition is off. This switch between the two power sources can be automatic by a switching circuit 2125 connected with the ignition. Particularly, if the purpose of the solar cells is to maintain a desired transmission similar to the one when the ignition was on, then their size could be small as only a fraction of the power is required for transmission maintenance. As in previously described applications, a control circuit 2125 supplies a control signal to the panel 2110, which is FIG. 21 is shown in place in the roof 2127 of a conveyance.

Serviceability

The addition of chromogenic filters 110 to skylights 100 increases the amount of maintenance the skylight 100 requires. Therefore, skylights 100 containing chromogenic filter 110 are preferably constructed for easily serviceability by the end user. The chromogenic filter 110 is easily removable without special tools, skills or risk of damage to the existing skylight 100 installation. There are a number of ways to accomplish this. The skylight of FIG. 5 has an easily removed diffuser, and its electrochromic filter is located close to the interior end of the skylight to allow it to be reached for removal. Any of a number of known electrical connectors, such as the plug and receptacle connector 710, shown can be used to permit quick and easy electrical connection. The filter itself is supported by any of a number of means permitting easy removal such as the simple projections 715 illustrated. The filter electrode connections can be contacts (not shown) built directly into the frame of the filter at its edge to automatically electrically connect to the filter via further contacts on the tube 105 inner surface.

An electronics box 720 that houses the control circuit 120 and/or a battery which may be associated with the chromogenic system is readily accessed through a panel 725 which can be opened from inside the tube 105". This panel is easily reachable for servicing and preferably located near the ceiling 727 within the tube as shown in FIG. 5. The panel 725 is closeable and ordinarily, like the interior surface 727 of the tube, it has high reflectivity on the surface which faces inside the tube. This minimizes light loss. The panel may be made of the same material as the light pipe material, or be surfaced with the same material as the light pipe material. The panel is preferably shaped so that it is substantially the same curvature as the tube.

An alternative approach to enhancing the interchangeability of the chromogenic filter 110 is shown in FIGS. 9(*a*) and (b). A movable tubular portion 185 of the skylight tube 105 is installed so that it hangs down ("floats"), but easily telescopes over or within an upper tube portion 195 of the tube 105 to open the tube for removal of the filter. This permits a person in the building attic to lift the floating section 185 and remove the chromogenic filter 110. The chromogenic filter 110 for this has a plastic or rubber frame 360 around the filter's perimeter that allows the bottom of the movable tubular portion 185 and the top of the lower tube portion 205 to fit within the frame 360. The frame 360 is a preformed rubber, or other flexible plastic gasket that is positioned or molded around the chromogenic filter 110 receiving its edges in a channel. The frame 360 positions the filter 110 on the lower tube portion 205 and positions the telescoping upper tube portion 185 to seat properly on the filter.

A chromogenic filter 810 may also be mounted in a way so that it is located below an internal diffuser (i.e., between the internal diffuser and the user as shown in FIG. 10. The edges including the electrical connectors in this embodiment are hidden by appropriately designing the trim 818 to accommodate leads 819. FIG. 10 shows one exemplary way of doing this. The advantage of this configuration is that the chromogenic panel is visible to the end user. Thus the user is able to appreciate the functionality and value of the electronically dimming filter even more. To further accentuate the chromogenic filter designer trim such as those used in the lighting industry can be used. The internal diffuser can be planar, as shown in FIG. 10, concave 930 in FIG. 11, or convex (not shown). It could be shaped and patterned in a way so that the light distribution can be optimized as desired for the task or the end-user. Of course, the haze enhancing features described previously can be employed to increase the diffuseness of the light entering an interior through this skylight as well as the further optics altering provisions discussed above.

A conventional 2 ft by 2 ft skylight is shown in FIG. 12. In this figure the chromogenic panels 1260 are accessible from the top after the plastic bubble 1261 is removed. The power to the chromogenic cells is supplied via the male spade connectors 1263, which are soldered or bonded on to a conductive patch 1265 (e.g., a silver frit or conductive adhesive) on the side edges of the substrate leading to the two transparent conductors. . The filters are connected to a harness 1267 from the controller by corrosion resistant alloy female spade connectors 1268. This way the chromogenic filters can be quickly disconnected from the harness. This figure shows four 1 ft×1 ft panels, but this is not necessary this may be replaced by one larger or more smaller chromogenic panels. As described earlier these can be powered by a solar cell, or by electric power only where the control box is placed either outside the skylight or within the skylight between the chromogenic panel and the outer dome. In the latter it is preferred to place the electronics so that it is not visible to the user from the room. As seen all the components, i.e., the chromogenic filter, the electronics, batteries if used, can be serviced separately or together as a unit.

While preferred embodiments of the invention have been described, this is exemplary only. Alternative features and embodiments may be employed without departure from the spirit and scope of the invention as set forth in the appended claims.

What is claimed is:

1. A skylight with a controllable solar energy throughput, including a chromogenic filter and at least two additional light transmitting filters between the chromogenic filter and the outside environment, a controller for controlling the amount of light passed by the chromogenic filter and a user interface for communicating from a user to the controller.

2. The skylight according to claim 1, wherein one of the two additional light transmitting filters is an outer dome and a further of the two additional filters is between the outer dome and the chromogenic filter.

3. The skylight according to claim 1, further comprising a mechanical shutter within the skylight and an actuator to actuate the shutter between greater and lesser light blocking dispositions.

4. The skylight according to claim 1, wherein the user interface remotely communicates with the controller.

5. The skylight according to claim 4, wherein the interface comprises one of a radio frequency and an infrared communications link.

6. The skylight according to claim 1, further comprising a power source including at least one of a solar cell, a battery and a fuel cell.

7. The skylight according to claim 3, wherein the shutter has a reflectivity greater than 60%.

8. The skylight according to claim 3, wherein the actuator has one of a shape memory alloy and metal coated polymer activation means.

9. The skylight according to claim 1, wherein the user interface is in communication with a plurality of controllers of a plurality skylight chromogenic filters.

10. The skylight according to claim 5, wherein the interface comprises a radio frequency link at a frequency below 1 GHz.

11. The skylight according to claim 1, further comprising a lamp above the chromogenic filter.

12. The skylight according to claim 11, further comprising an ultraviolet light filter between the lamp and the chromogenic filter.

13. The skylight according to claim 1, wherein the chromogenic filter employs at least one of a transition metal oxide and a conductive polymer as an electrochromic material.

14. The skylight according to claim 1, further comprising a sensor that distinguishes between day and night.

15. The skylight according to claim 1, wherein one of the two additional light transmitting filters is an outer dome and the outer dome is one of photochromic and thermochromic.

16. The skylight according to claim 1, wherein the skylight is a tubular skylight and the chromogenic filter is visible to the user.

17. The skylight according to claim 1, wherein the additional light transmitting filter that is closest to the chromogenic filter is patterned.

18. The skylight according to claim 1, wherein the additional light transmitting filter that is closest to the chromogenic filter is shaped substantially as a portion of a spherical arc.

19. The skylight according to claim 1, wherein the chromogenic filter closes an interior end of the skylight and is visible from within an interior served by the skylight.

20. The skylight according to claim 19, wherein a transition of the chromogenic filter between bleached and colored states is apparent from within an interior served by the skylight.

21. The skylight according to claim 1, wherein the controller has filter maintenance circuitry for instituting filter maintenance procedures.

22. The skylight according to claim 1, wherein at least one of the at least two additional filters are ultraviolet blocking filters.

23. The skylight according to claim 1, wherein at least one of two additional filters is patterned and colored.

24. The skylight according to claim 6, wherein the power source includes a solar cell mounted within the skylight.

25. The skylight according to claim 6, wherein the power source includes both a solar cell and a battery, the battery being a rechargeable battery and the solar cell being connected to the battery for changing the battery.

26. The skylight according to claim 1, wherein the chromogenic filter has electrochromic coatings.

27. The skylight according to claim 1, wherein the controller includes a light sensor within the skylight, the controller terminating the application of a signal to the chromogenic filter upon the sensor sensing the absence of light entering the skylight, whereby the chromogenic filter relaxes to a neutral state.

28. The skylight according to claim 10, wherein the user interface includes coding for the radio frequency link, the controller including code recognition, whereby the user interface communicates only with a pre-selected skylight controller or controllers.

29. The skylight according to claim 28, further including a plurality of proximate skylights having controllers with code recognition set to respond to the same user interface code.

30. The skylight according to claim 10, wherein the user interface radio frequency signal power is less than 5 mW.

31. The skylight according to claim 1, wherein the chromogenic filter is an electrochromic filter, the controller supplies as operating signal to the electrochromic filter, the coloring the electrochromic filter affecting an electrical characteristic of the filter, the controller further including circuitry monitoring the electrical characteristic to indirectly monitor the coloring of the electrochromic filter.

32. The skylight according to claim 31, wherein the electrical characteristic of the filter is the open cell potential of the electrochromic filter.

33. The skylight according to claim 1, wherein the chromogenic filter is an electrochromic filter, the controller intermittently applies and terminate a bleaching signal, the controller having circuitry to terminate the bleaching signal and to reapply the bleaching signal upon a change in light transmission through the electrochromic filter less than 5%.

34. The skylight according to claim 33, wherein the controller circuitry reapplies the bleaching signal upon a change in light transmission through the electrochromic filter less than 2%.

35. The skylight according to claim 1, wherein the chromogenic filter is an electrochromic filter, the controller applies a bleaching signal to the electrochromic filter and the bleaching signal is supplied from at least one of an AC to DC adapter to a 115v mains, a solar cell, a fuel cell, or a chargeable or non-rechargeable battery.

36. The skylight according to claim 35, wherein the bleaching signal is applied directly through a switch to the electrochromic filter by at least one solar cell.

37. The skylight according to claim 35, wherein the bleaching signal is applied through a switch directly to the electrochromic filter from a rechargeable or non-rechargeable battery.

38. The skylight according to claim 37, wherein the battery is rechargeable and a solar cell is connected to supply a recharging current for the battery.

39. The skylight according to claim 38, wherein the controller further comprises power conditioning circuitry to at least an input to or an output from the rechargeable battery.

40. A skylight having an outer light transmitting cover, a chromogenic filter, a controller for the chromogenic filter and a remote user interface for user control of the outer cover being one of clear, translucent white and bronze and the chromogenic filter coloring to one of green, gray, brown and blue.

41. The skylight according to claim 40, wherein the outer cover has visible light transmission in the range of 15 to 60%.

42. The skylight according to claim 40, wherein the combination of colors of the outer cover and of the colored chromogenic filter is neutral to an observer within an interior served by the skylight.

43. The skylight according to claim 40, wherein the chromogenic filter is comprised of a plurality of discrete chromogenic filter sections with edges adjacent one another.

44. The skylight according to claim 40, wherein the controller is powered by at least one of a solar cell, a battery and a fuel cell.

45. The skylight according to claim 40, wherein the interface comprises one of a radio frequency and an infrared communications link.

46. A user controllable chromogenic filter system for varying the transmission of light through the filter and into an interior, the filter system including a controller coupled to the chromogenic filter for controlling the transmission of light through the chromogenic filter and a radio frequency remote control user interface.

47. The chromogenic filter system of claim 46, further including a local area network in communication with the controller, the user interface connecting by radio frequency link to the local area network.

48. The chromogenic filter system of claim 46, further comprising a power source including at least one of a solar cell, a battery and a fuel cell.

49. The chromogenic filter system of claim 47, including mechanically functioning components of at least one of windows and skylights equipped with chromogenic filters, and the local area network includes controls for the mechanically functioning components.

50. The chromogenic filter system of claim 47, wherein the local area network includes controls for further equipment.

51. The chromogenic filter system of claim 47, wherein the local area network is a part of an energy management system.

52. The chromogenic filter system of claim 47, wherein the chromogenic filter is installed in light transmitting relation to one of a vehicle and a building.

53. The chromogenic filter system of claim 47, wherein the user interface is at least one of a mobile phone, mobile computer and mobile processor.

54. A system for controlling a chromogenic filter used in windows or skylights, including a controller coupled to the chromogenic filter for controlling the transmission of light through the chromogenic filter and a remote user interface for user control of the chromogenic filter by communication with the controller, the user interface and the controller being in digital communication via power lines.

55. The system for controlling a chromogenic filter according to claim 54, wherein the power lines are a part of a digital local area network.

56. The system for controlling a chromogenic filter according to claim 54, further comprising a power source including at least one of a solar cell, a battery and a fuel cell.

57. The system for controlling a chromogenic filter according to claim 55, including mechanically functioning components of at least one of windows and skylights equipped with chromogenic filters, and the local area network includes controls for the mechanically functioning components.

58. The system for controlling a chromogenic filter according to claim 55, wherein the local area network includes controls for further equipment.

59. The system for controlling a chromogenic filter according to claim 55, wherein the local area network is a part of an energy management system.

60. The system for controlling a chromogenic filter according to claim 55, wherein the chromogenic filter is installed in light transmitting relation to one of a vehicle and a building.

61. A skylight with a controllable solar energy throughput, including a chromogenic filter, a mechanical shutter, a controller for controlling the amount of light passed by the chromogenic filter, an actuator for mechanically moving the shutter, and a user interface for communicating from a user to at least one of the controller and the actuator.

62. The skylight according to claim 61, wherein one of the chromogenic filter and a second light transmitting filter is located at an interior end of the skylight visible from an interior served by the skylight and is removably secured in place for convenience in maintenance and repair.

63. The skylight according to claim 61, wherein at least one surface of the shutter has a reflectance greater than substantially 80% that is one of specular and diffuse.

64. The skylight according to claim 61, wherein the controller includes an actuator for the control of the mechanical shutter to thereby control the amount of light through the skylight, and the chromogenic filter being operative to change between a colored and a bleached state to alter the color of light through the skylight.

65. The skylight according to claim 61, wherein the controller includes an actuator for the control of the mechanical shutter to effect gross control of the light through the skylight, and the chromogenic filter being operative to change between a colored and a bleached state to effect fine adjustment of the light through the skylight.

66. The skylight according to claim 61, wherein the user interface remotely communicates with the controller.

67. The skylight according to claim 66, wherein the user interface comprises one of a radio frequency and an infrared communication link.

68. The skylight according to claim 61, further comprising a power source including at least one of a solar cell, a battery, and a fuel cell.

69. The skylight according to claim 61, wherein the shutter has a reflectivity greater than 60%.

70. The skylight according to claim 61, wherein the actuator has one of a shape memory alloy and metal coated polymer activation means.

71. The skylight according to claim 61, wherein the user interface is in communication with a plurality of controllers of a plurality skylight chromogenic filters.

72. The skylight according to claim 67, wherein the interface comprises a radio frequency link at a frequency below 1 GHz.

73. The skylight according to claim 65, further comprising a lamp above the chromogenic filter.

74. The skylight according to claim 73, further comprising an ultraviolet light filter between the lamp and the chromogenic filter.

75. The skylight according to claim 61, wherein the chromogenic filter employs at least one of a transition metal oxide and a conductive polymer as an electrochromic material.

76. The skylight according to claim 61, further comprising a sensor that distinguishes between day and night.

77. The skylight according to claim 61, wherein the skylight has an outer dome and the outer dome is thermochromic.

78. The skylight according to claim 61, wherein the skylight is a tubular skylight and the chromogenic filter is visible to the user.

79. The skylight according to claim 73, wherein the user interface is operative to control the chromogenic filter via the controller, the shutter via the actuator, and the lamp via a lamp supply circuit.

80. The skylight according to claim 79, wherein the user interface is hardwired to the chromogenic filter controller, the shutter actuator, and the lamp supply circuit.

81. The skylight according to claim 67, wherein the user interface is an infrared remote control device with multiple infrared sensors positioned to increase the area within an interior from which the interface can operatively communicate.

82. The skylight according to claim 67, wherein the user interface is an infrared remote control device with at least one infrared sensor located behind an interior light diffuser of the skylight.

83. The skylight according to claim 61, wherein the shutter has one of a light diffusing and light reflecting surface.

* * * * *